United States Patent
Nakamura et al.

[11] Patent Number: 5,212,577
[45] Date of Patent: May 18, 1993

[54] OPTICAL COMMUNICATION EQUIPMENT AND OPTICAL COMMUNICATION METHOD

[75] Inventors: Kenji Nakamura, Hadano; Jun Nitta, Sagamihara, both of Japan

[73] Assignee: Canon Kabushiki Kaisha, Tokyo, Japan

[21] Appl. No.: 922,001

[22] Filed: Aug. 4, 1992

Related U.S. Application Data

[63] Continuation of Ser. No. 641,550, Jan. 15, 1991, abandoned.

[30] Foreign Application Priority Data

Jan. 19, 1990 [JP] Japan ................................ 2-8368
Jan. 19, 1990 [JP] Japan ................................ 2-8369

[51] Int. Cl.$^5$ ............................................. H04J 14/02
[52] U.S. Cl. .................................... 359/124; 359/114
[58] Field of Search ............... 359/113, 114, 124, 143, 359/155, 177, 125, 133

[56] References Cited

U.S. PATENT DOCUMENTS

| | | | |
|---|---|---|---|
| 4,592,043 | 5/1986 | Williams | 359/126 |
| 4,662,715 | 5/1987 | Shutterly | 370/3 |
| 4,797,879 | 1/1989 | Habbab et al. | 370/3 |

FOREIGN PATENT DOCUMENTS

| | | |
|---|---|---|
| 0078714 | 5/1983 | European Pat. Off. |
| 0227148 | 7/1987 | European Pat. Off. |
| 0240124 | 10/1987 | European Pat. Off. ............ 455/606 |
| 0381102 | 8/1990 | European Pat. Off. |
| 0221232 | 9/1987 | Japan .................................. 455/606 |
| 63-211836 | 2/1988 | Japan |

OTHER PUBLICATIONS

Electrical Communications, vol. 62, Nos. 3-4, 1988, pp. 343-350, Fioretti et al.
IEEE Comm. Mag., vol. 27, No. 12, Oct. 1989, pp. 20-26, Henry IBM Technical Disc. Bull., vol. 30, No. 9, Feb. 1988, pp. 262-267.
IEEE/IEIC Global Telecom. Conf. 1987, pp. 37.4.1-3, Goodman et al., "Design and Demonstration of the LAMBDANET System".

*Primary Examiner*—Edward L. Coles, Sr.
*Assistant Examiner*—Kinfe-Michael Negash
*Attorney, Agent, or Firm*—Fitzpatrick, Cella, Harper & Scinto

[57] ABSTRACT

An optical communication terminal detects an unused first wavelength in a wavelength range in response to a transmission request and transmits a call signal to a transmission destination using the first wavelength. An acknowledgement signal from the destination is detected in a portion of the wavelength range not including the first wavelength. When a call signal addressed to the terminal from another terminal is detected thereat and the terminal is ready for communication, an unused second wavelength in the wavelength range is detected and an acknowledgement signal is sent using the second wavelength in response to the call signal.

17 Claims, 16 Drawing Sheets

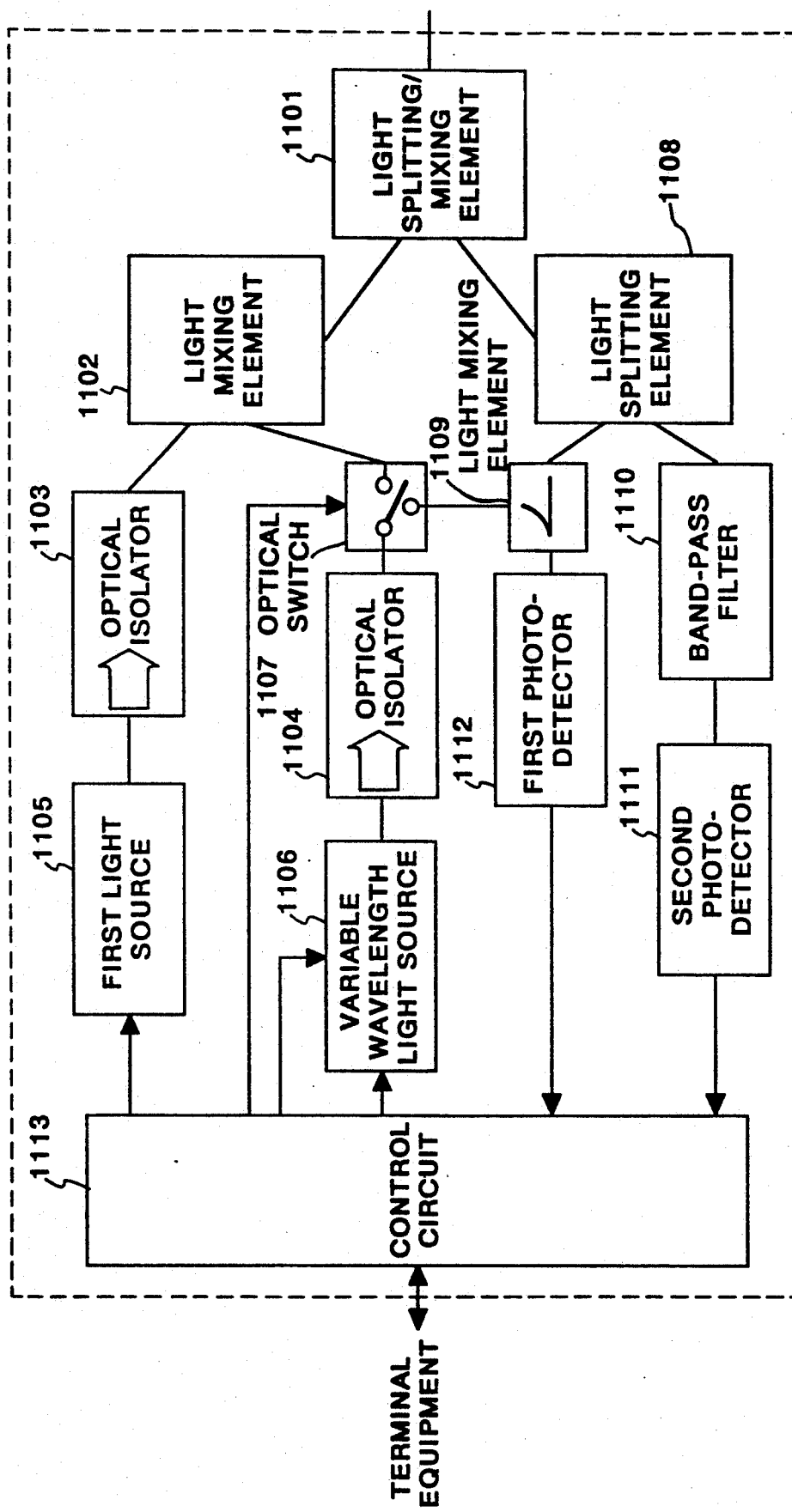
F I G. 13

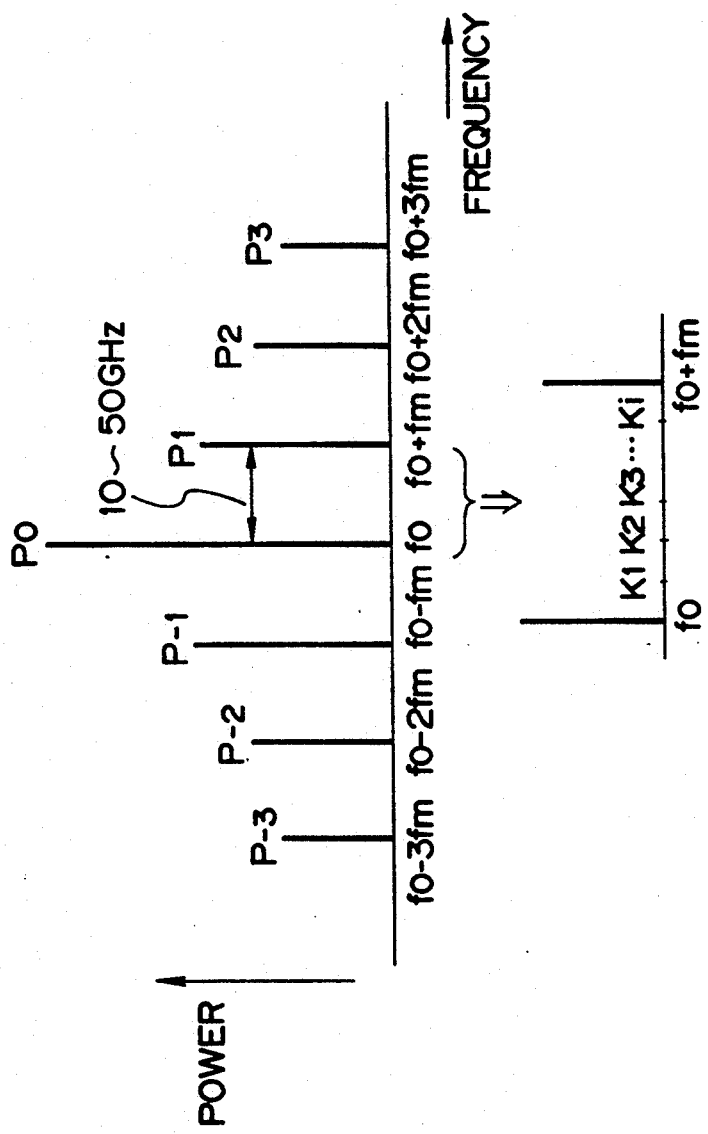
F I G. 17

OPTICAL COMMUNICATION EQUIPMENT AND OPTICAL COMMUNICATION METHOD

This application is a continuation of application Ser. No. 07/641,550 filed Jan. 15, 1991 now abandoned.

BACKGROUND OF THE INVENTION

1. Field of the Invention

The present invention relates to an optical communication equipment for performing an optical communication with another equipment via an optical communication medium.

2. Description of the Prior Art

In a conventional wavelength-division-multiplexing communication system, several to several tens of light waves are sent by slightly changing their wavelengths, thus allowing a large-capacity communication. It is important to stabilize the oscillation wavelength such large capacity communication.

For this purpose, some methods of stabilizing an oscillation wavelength have been proposed.

For example, in one method, oscillation frequencies are individually assigned to transmission light sources, and respective terminal stations manage the corresponding oscillation frequencies.

In another method, a central station for managing frequencies is arranged, and sends light serving as a predetermined reference to all the subscribers, and respective subscribers tune wavelengths based on the reference light.

As the method of managing frequencies by a central station, a method disclosed in Japanese Patent Laid-Open No. 63-52528 or the like is known.

FIG. 15 is a block diagram showing the principle of the conventional method of managing frequencies by a central station, and FIG. 16 shows an arrangement of a system.

In FIG. 15, reference numeral 7010 denotes a frequency reference light extraction unit for separating frequency reference light from light sent from the central station; 7011, a heterodyne detection unit for performing heterodyne detection of the frequency reference light; 7012, a local oscillation or transmission light source; 7013, a tuner for setting an oscillation frequency of the light source 7012; 7014, a peak detection unit for detecting a peak value of a beat signal obtained by the heterodyne detection unit 7011; and 7015, a frequency position detection unit for detecting a frequency position.

Since a light signal obtained by high-speed modulating oscillation light from, e.g., a stabilized light source is sent as the frequency reference light from the central station to each terminal station, each terminal station causes the frequency reference light extraction unit 7010 to extract the frequency reference light from the light sent from the central station.

An oscillation frequency of the light source 7012 is changed by the tuner 7013, and the heterodyne detection unit 7011 mixes an output from the frequency reference light extraction unit 7010 and an output from the light source 7012, thereby performing heterodyne detection.

The peak detection unit 7014 detects a peak value of a beat signal obtained in detection by the heterodyne detection unit 7011. When the frequency of the light source 7012 is changed by the tuner 7013, a plurality of peak values can be obtained. The frequency position detection unit 7015 compares peak values of adjacent beats, thereby detecting an FM side band of a presently tuned frequency.

In FIG. 16, reference numeral 7020 denotes a star coupler; 7021, a central station; 7022-1 to 7022-4, terminal stations of subscribers; $T_x$, a transmitter; and $R_x$, a receiver.

The terminal stations 7022-1 to 7022-4 are connected by an optical fiber via the star coupler 7020. The central station 7021 is similarly connected via the star coupler 7020.

Multi-frequency transmission using coherent light is then performed. In this case, a reference for setting a frequency is managed not by the terminal stations 7022-1 to 7022-4 individually, but by the central station 7021 systematically, and the central station sends the frequency reference to the terminal stations 7022-1 to 7022-4.

FIG. 17 shows an arrangement of the frequency reference.

In the central station 7021, when oscillation light from the stabilized light source is high-speed modulated at, e.g., 10 GHz to 50 GHz, side bands given by $\{f_0 \pm nf_m\}$ appear around a central frequency $f_0$, as shown in FIG. 17.

Therefore, the terminal stations detect these side bands, and can determine the positions of the side bands with respect to the central frequency, so that a frequency of a light source used in transmission or reception can be set with reference to the determined position.

For example, many frequencies $K_0, K_1, \ldots, K_i$ of the terminal stations can be set between the frequencies $f_0$ and $f_0 + f_m$. Therefore, when a reception or transmission frequency band is determined, each terminal station detects a frequency $f_0 + f_m$ of the frequency reference light, thereby setting a frequency offset from these reference frequencies by a predetermined frequency.

However, since frequency bands to be used by light transmitters must be strictly managed and set in order to prevent radio interference, the prior art system suffers from the following drawbacks.

(1) When light transmitters individually have reference wavelength light sources, the temperatures of light-emitting elements of the light transmitters must be strictly controlled to maintain the same reference wavelength.

(2) If a wavelength to be used is assigned in advance to each light transmitter, a given light transmitter cannot use a wavelength assigned to another light transmitter, and use efficiency of wavelengths is impaired.

SUMMARY OF THE INVENTION invention has been made to eliminate the conventional drawbacks, and has as its object to allow wavelength-division-multiplexing communication with high wavelength utilization efficiency, which need not have a strict reference wavelength management station, and the like.

It is another object of the present invention to provide an optical communication equipment which is easy to utilize, and performs communications using unused wavelength ranges in a wavelength range used for communications, so that a reference wavelength can be managed and set with a high degree of freedom among a light transmitter, a light receiver, and a light transmitter/receiver.

The present invention comprises the following arrangement as means for achieving the above objects.

More specifically, there is provided an optical communication equipment which comprises at least transmission means for transmitting an arbitrary one wavelength of an entire wavelength range commonly used by all the equipments connected to a network, and reception means for receiving an arbitrary one wavelength which is the same as or different from the transmission wavelength of the transmission means, and is connected to other optical communication equipments via an optical communication medium, comprising first wavelength detection means for, when a transmission request is issued by its own equipment, detecting an unused first wavelength from the entire wavelength range to be commonly used, call signal transmission means for continuously transmitting a call signal to a transmission destination using the first wavelength detected by the first wavelength detection means, acknowledgement signal detection means for detecting a acknowledgement signal sent from the destination in response to the call signal transmitted from the call signal transmission means from a wavelength range other than the first wavelength, call signal detection means for, when the optical communication equipment is not in a communication state and does not request transmission, detecting a call signal addressed to its own equipment from another equipment which requests transmission, second wavelength detection means for detecting an unused second wavelength from the entire wavelength range to be commonly used, and acknowledgement signal transmission means for transmitting a acknowledgement signal for the call signal addressed to its own equipment using the second wavelength detected by the second wavelength detection means.

In the above arrangement, each terminal has a function of grasping use conditions of wavelengths over the entire wavelength range commonly used by all the terminals when a communication is performed. A terminal which requests transmission detects a first unused wavelength by the function, and can transmit a call signal for specifying a receiving terminal using the detected unused wavelength.

When a given terminal is designated as a receiving terminal by a terminal which requests transmission, it can detect by the function that the own terminal is designated as the receiving terminal. The given terminal detects a second unused wavelength using the function, and can transmit a signal indicating that the terminal is ready for reception to the transmission requesting terminal using the second unused wavelength.

Furthermore, when a given station requests transmission, it receives the above signal by the function, and thereafter, can start transmission of information using the first or second unused wavelength to a receiving terminal.

In this manner, the conventional drawbacks can be eliminated, and a wavelength-division-multiplexing communication with high wavelength utilization efficiency can be realized without requiring a strict reference wavelength management station or the like.

The present invention comprises the following arrangement as another means for achieving the above objects.

More specifically, there is provided an optical communication equipment comprising first wavelength detection means for, when a transmission request is issued by its own equipment, detecting an unused communication enable wavelength from a usable wavelength range, first transmission means for continuously transmitting a communication destination specifying signal using the wavelength detected by the first wavelength detection means, second transmission means for outputting a communication request to a communication destination using a control signal communication wavelength in the usable wavelength range, reception enable signal detection means for detecting a reception enable information signal from the communication destination from the usable wavelength range, first communication means for, when the reception enable signal detection means detects the reception enable information signal, performing a communication with the communication destination using the wavelength detected by the first wavelength detection means, communication request detection means for detecting a communication request addressed to its own equipment at the control signal communication wavelength, specifying signal detection means for, when the communication request detection means detects the communication request, detecting a communication destination specifying signal addressed to its own equipment in the usable wavelength range, and third transmission means for, when the specifying signal detection means detects the specifying signal, transmitting a reception enable information signal at the control signal communication wavelength.

In the above arrangement, a light transmitter or a light transmitter/receiver having a function of detecting a wavelength range unused in a communication from the entire wavelength range to be used in communications, and a function of fixing a wavelength of a transmission light source in the wavelength range (detected wavelength range), and a light receiver or a light transmitter/receiver having a function of detecting a wavelength of light used in a communication addressed to its own station from a wavelength range to be used in communications perform a communication using a wavelength range unused in communications in the entire wavelength range to be used in communications, so that a reference wavelength can be managed and set with a high degree of freedom among the light transmitter, the light receiver, and the light transmitter/receiver. Thus, an optical communication equipment which is very easy to utilize can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a block diagram of a light transmitter according to the sixth embodiment of the present invention;

FIGS. 15 to 17 are views for explaining a conventional optical communication equipment, in which FIG. 15 is a block diagram showing the principle of a conventional method of managing a frequency by a central station, FIG. 16 is a diagram of a conventional optical communication system, and FIG. 17 is a chart showing a conventional arrangement of a frequency reference.

DETAILED DESCRIPTION OF THE INVENTION

Embodiments of the present invention will be described in detail hereinafter with reference to the accompanying drawings.

First Embodiment

Figure 1:
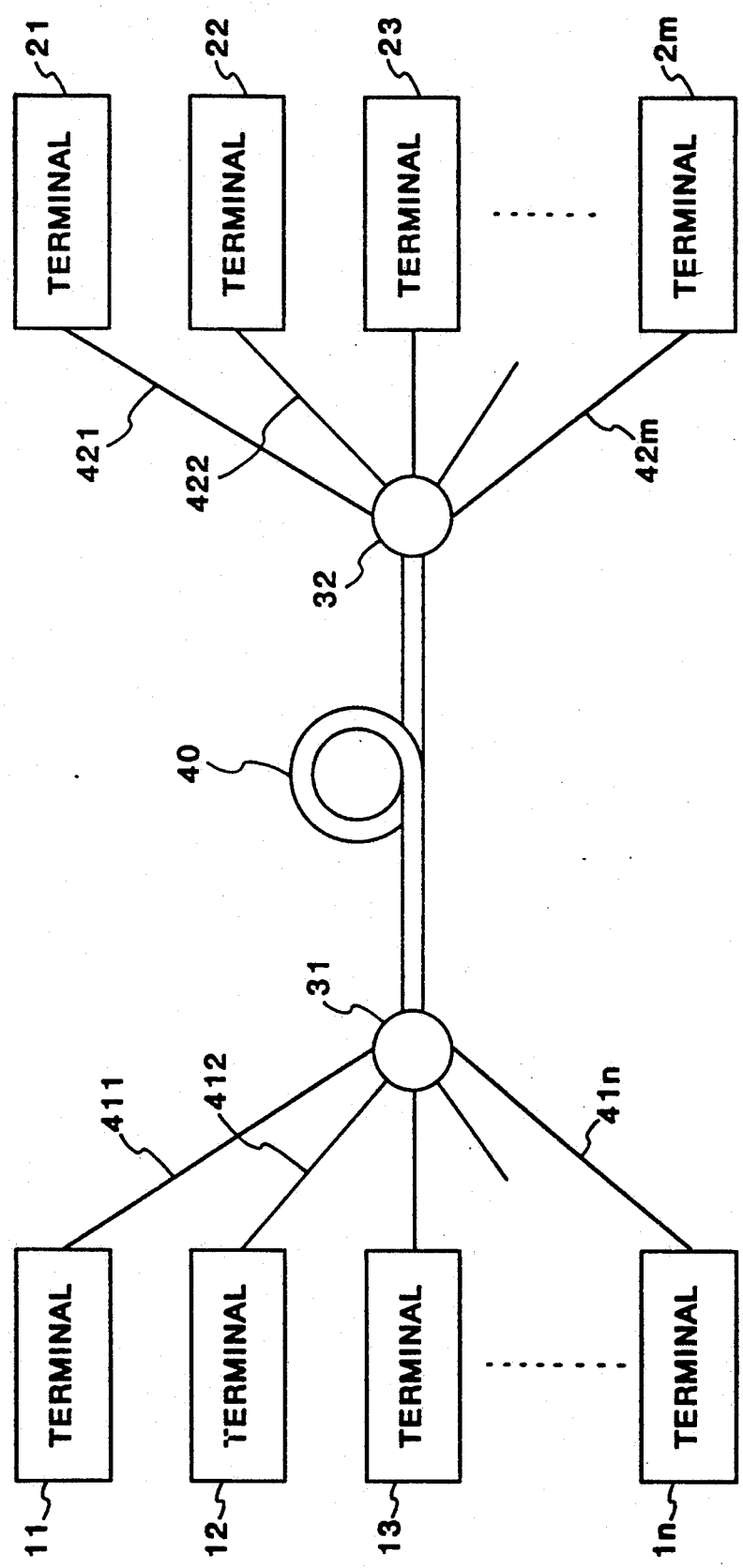
FIG. 1 is a diagram showing the entire system according to the first embodiment of the present invention.
Figure 2:
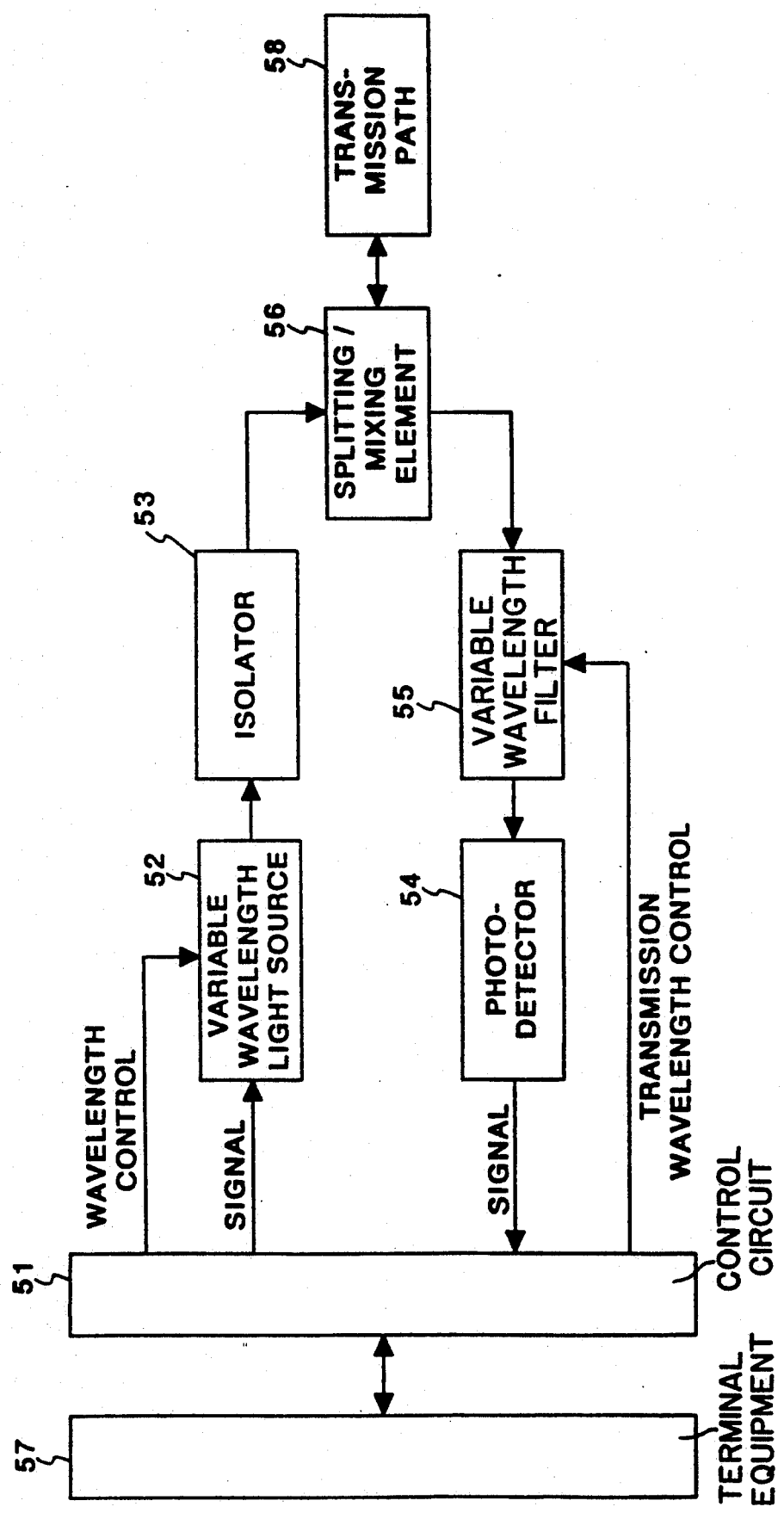
FIG. 2 is a block diagram of a light transmitter/receiver of the first embodiment.

FIGS. 1 and 2 show an embodiment of the present invention, in which FIG. 1 is a diagram of the entire wavelength-division-multiplexing optical communication system constituted by devices according to the embodiment of the present invention, and FIG. 2 is a block diagram showing an arrangement of a light transmitter/receiver of each terminal as an optical communication equipment of this embodiment.

In FIG. 1, reference numerals 11 to 1n and 21 to 2m denote optical communication terminals; 40, 411 to 41n, and 421 to 42m, optical fibers as optical transmission paths; and 31 and 32, optical star couplers.

In FIG. 2, reference numeral 51 denotes a control circuit for controlling the entire embodiment; 52, a variable wavelength light source; 53, an optical isolator; 54, a photodetector; 55, a variable wavelength band-pass filter which can change a wavelength range of light transmitted therethrough; 56, a light splitting/mixing element comprising, e.g., a half mirror or a beam splitter; 57, a terminal equipment; and 58, a transmission path, comprising an optical fiber, for performing an optical communication.

In the above arrangement, the control circuit 51 controls operations of the variable wavelength light source 52, the variable wavelength filter 55, and the photodetector 54 to transmit information from the terminal equipment 57 onto the transmission path 58, and to output information from the transmission path 58 to the terminal equipment 57.

The variable wavelength light source 52 comprises a variable wavelength DBR semiconductor laser which comprises a DBR mirror having a structure for injecting carriers in a DBR region (distributed Bragg reflection mirror) region to change its Bragg wavelength. The light source can adjust an injection amount of carriers into the DBR region to continuously change its oscillation wavelength. As the variable wavelength light source 52, a light source having a structure described in K. KOTAKI, M. MATSUDA, M. YANO, H. ISHIKAWA, and H. IMAI, Electronic Letters, Vol. 23, No. 7, pp. 325 to 327, 1987 can be used.

In this embodiment, the variable wavelength light source 52 comprises a wavelength adjustment unit for changing its oscillation wavelength, and an output light modulation unit for performing intensity modulation of output light.

When a variable wavelength DBR semiconductor laser is adopted, a DBR unit corresponds to the wavelength adjustment unit, and an active region corresponds to the output light modulation unit.

Furthermore, the variable wavelength band-pass filter 55 can be realized by using a variable wavelength DBR (distributed Bragg reflection mirror) for changing its Bragg wavelength by carrier injection as described above (e.g., one described in Japanese Patent Laid-Open No. 60-175025 can be used).

The operation of this embodiment with the above arrangement will be described below.

Figure 3:
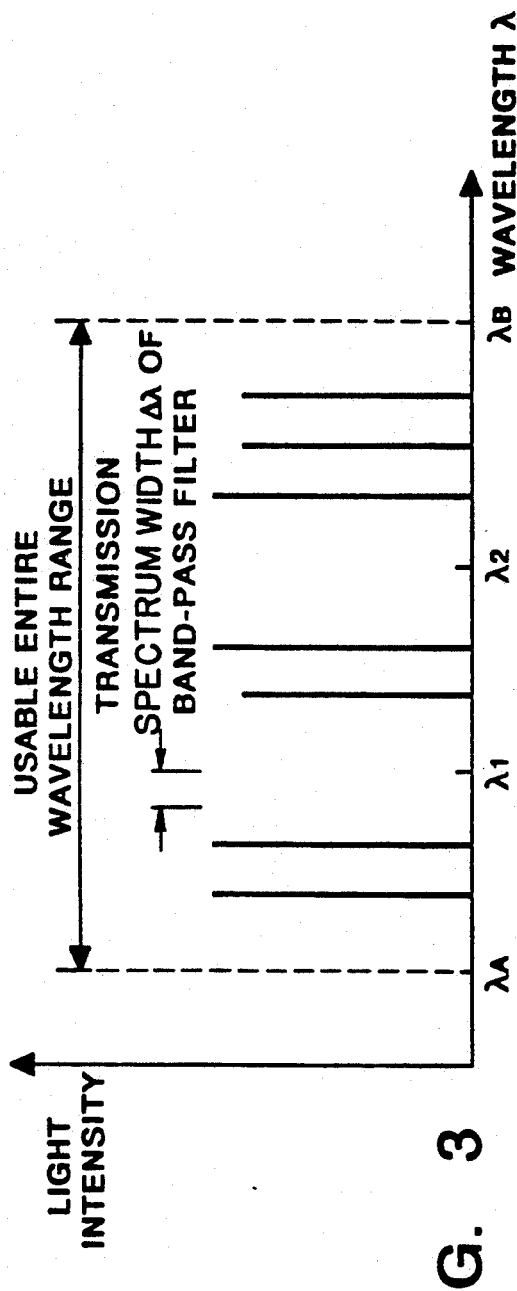
FIG. 3 is a chart showing an assignment state of wavelengths to be used in communications in the first embodiment.

Assume that each terminal can use a wavelength range from a wavelength $\lambda_A$ to a wavelength $\lambda_B$, as shown in FIG. 3, and a transmission spectrum width of the band-pass filter is set to be $\Delta\lambda$. If a plurality of communications are performed in the width $\Delta\lambda$, radio interference occurs. Therefore, only one communication can enter the width $\Delta\lambda$.

A case will be exemplified below wherein a communication from, e.g., the terminal 12 to the terminal 23 is started.

In this embodiment, this communication is started by the following procedure.

(1) A terminal which is in a non-communication state, and does not request transmission (including the terminal 23) causes its variable wavelength filter to always sweep a range between the wavelengths $\lambda_A$ and $\lambda_B$, and to receive signals, thereby checking whether or not a call signal to its own station is generated.

(2) The transmission requesting terminal 12 sets its own photodetector 54 in a light-receiving state to sweep transmission wavelengths of the variable wavelength filter 55 between $\lambda_A$ and $\lambda_B$, thereby checking a use state of wavelengths in the entire usable wavelength range, and selects a first wavelength $\lambda_1$ from unused wavelengths.

The transmission requesting terminal 12 begins to transmit a call signal including information for identifying its own terminal 12 and the destination terminal 23 using the wavelength $\lambda_1$.

The terminal 12 also causes the variable wavelength filter 55 to sweep a wavelength range between $\lambda_A$ and $\lambda_B$ to receive signals, thereby beginning to check whether or not a acknowledgement signal for the transmitted call signal is returned.

(3) The terminal 23 recognizes by the process (1) that a call signal to its own station is issued, and prepares for reception upon the detection of the call signal specifying that it is the communication destination.

The terminal 23 checks a wavelength range between $\lambda_A$ and $\lambda_B$ to detect an unused second wavelength $\lambda_2$. The terminal then begins to transmit a acknowledgement signal including a message indicating that the call signal is received and preparation for reception is completed, using the unused second wavelength $\lambda_2$.

(4) The terminal 12 receives the acknowledgement signal sent from the destination terminal 23 in the process (3), and can detect that the destination terminal 23 is ready for reception by detection of the acknowledgement as a reception enable signal from the destination station.

Since preparation for a communication is completed, the terminal 12 begins to transmit information to the destination terminal 23 using the wavelength $\lambda_1$.

In this embodiment, an unused wavelength can be selected from the entire usable wavelength range and a communication can be started by the above-mentioned procedure.

In the above-mentioned procedure, a communication cannot often be started between the terminals 12 and 23, for example, when the terminal 23 is in a communication state, and cannot receive the call signal from the terminal 12, or when no unused second wavelength is available, or when another terminal which requests transmission other than the terminal 12 simultaneously issues a call signal at the unused first frequency.

In order to cope with such situation, the terminal 12 may have a function of interrupting transmission of a call signal when a acknowledgement signal cannot be received within a predetermined period of time after it begins to transmit the call signal, and restarting the above-mentioned procedure later.

As can be seen from the above description, according to this embodiment, a wavelength-division-multiplexing optical communication can be realized without performing strict reference wavelength control and wavelength absolute value control.

Furthermore, as a degree of multiplex, channels corresponding in number to the quotient obtained by dividing the entire usable wavelength range by the transmission spectrum width of the band-pass filter can be obtained.

For this reason, wavelength-division-multiplexing communications with very high efficiency can be performed.

Second Embodiment

The second embodiment of the present invention will be described below with reference to FIGS. 4 and 5.

Figure 4:
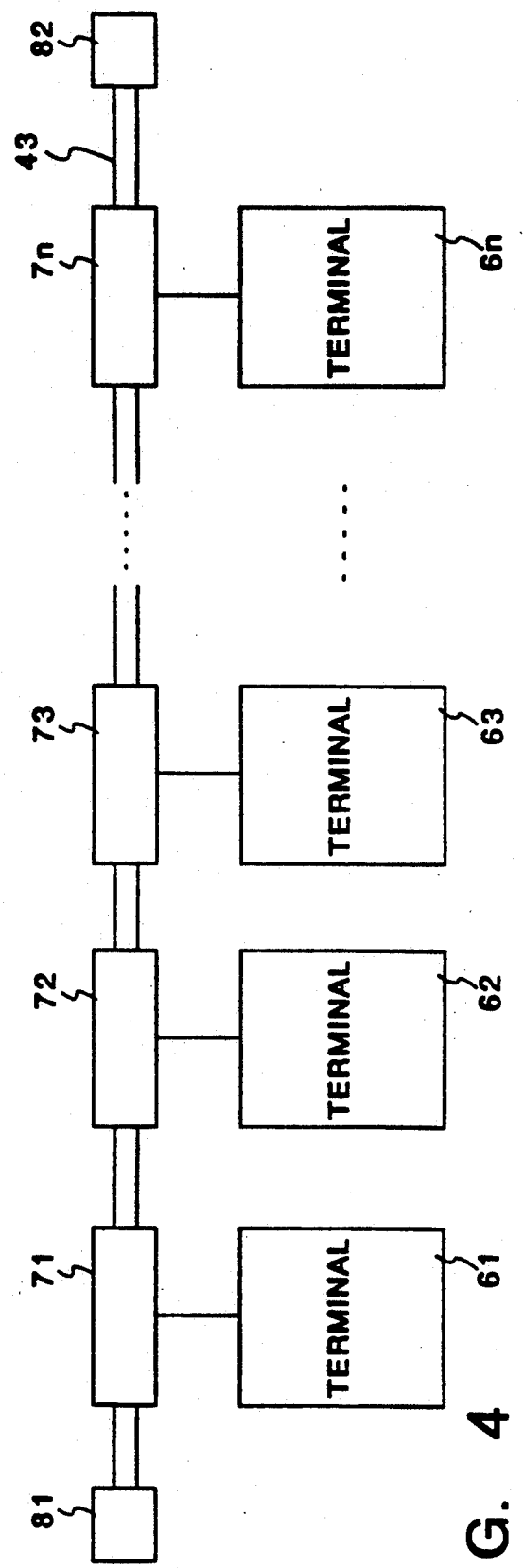
FIG. 4 is a diagram showing the entire system according to the second embodiment of the present invention.

FIG. 4 is a diagram of the entire wavelength-division-multiplexing communication system according to the second embodiment of the present invention.

In FIG. 4, reference numeral 43 denotes an optical fiber transmission path; 61 to 6n, terminals; 71 to 7n, optical nodes for transmitting light signals from the terminals 61 to 6n onto the optical fiber transmission path, and sending some of light signals on the optical fiber transmission path to the terminals; and 81 and 82, terminating devices for preventing light signals from being reflected at the ends of the optical fiber transmission path.

Figure 5:
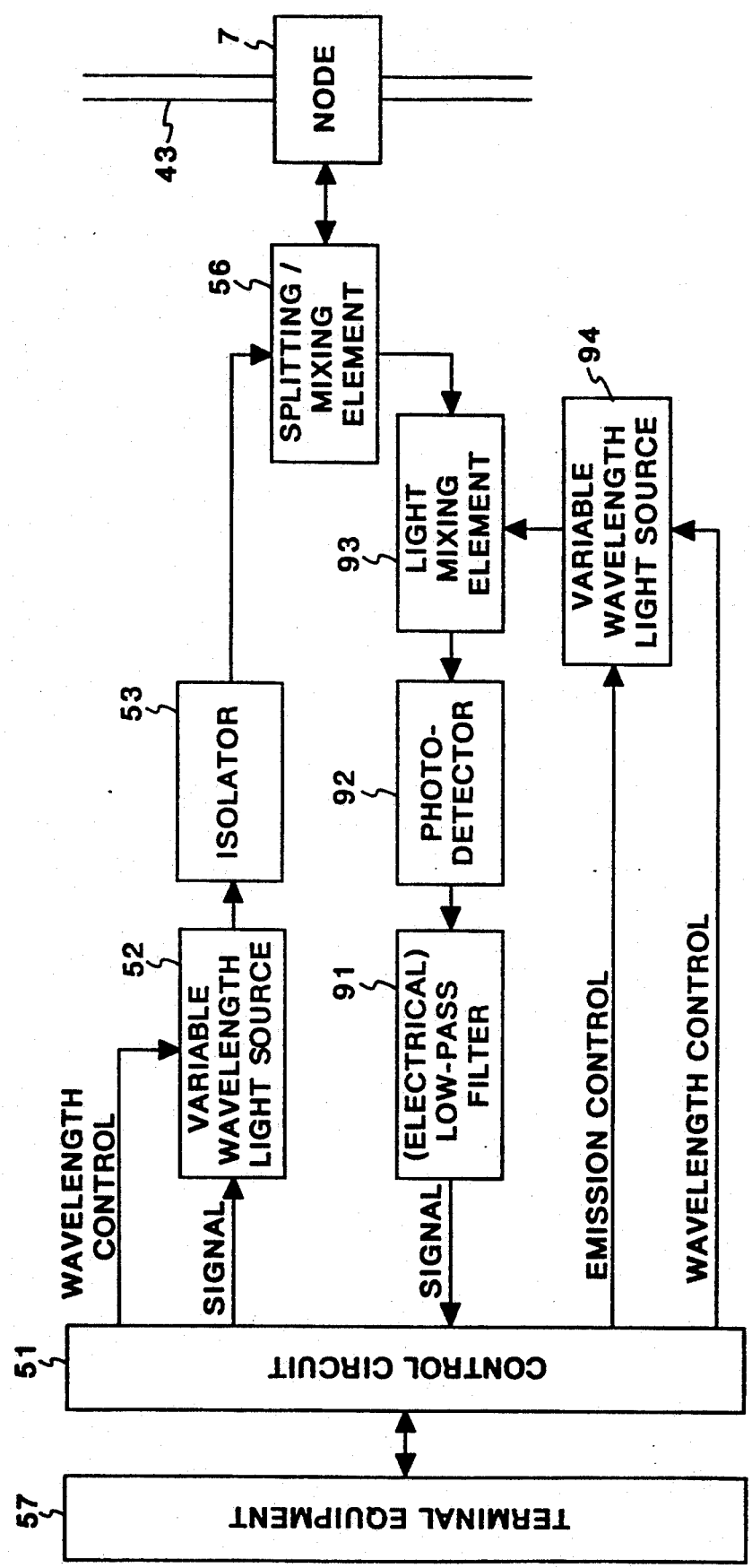
FIG. 5 is a block diagram of a light transmitter/receiver of the second embodiment.

FIG. 5 is a block diagram showing an arrangement of a light transmitter/receiver of the terminal used in the system of the second embodiment shown in FIG. 4.

In FIG. 5, reference numeral 51 denotes a control circuit; 52, a first variable wavelength light source; 53, an optical isolator; 56, a light splitting/mixing element; and 57, a terminal equipment. These components can be the same as those described in the first embodiment.

Reference numeral 7 denotes an optical node; and 43, an optical fiber transmission path. These components allow a bus type network formation shown in FIG. 4.

In FIG. 5, reference numeral 91 denotes a low-pass filter for an electrical signal; 92, a photodetector; 93, a light mixing element; and 94, a second variable wavelength light source.

In this embodiment, a procedure for starting a communication is basically the same as the first embodiment. Differences from the first embodiment are that reception signals are swept over the entire usable wavelength range to detect unused first and second wavelengths, and to detect a call signal or a acknowledgement signal to its own terminal.

These means in this embodiment are called optical heterodyne detection, and will be described in detail below.

A wavelength-division-multiplexing signal transmitted through the optical fiber transmission path 43 reaches the light mixing element 93 via the node 7 and the splitting/mixing element 56, and is mixed with light from the second variable wavelength light source 94. The mixed signal is input to the photodetector 92 and is subjected to square law detection, thus outputting a heterodyne-detected electrical signal of two light signals to the low-pass filter 91.

When there is no light on the line, a signal output from the photodetector 92 includes only a DC component.

When there is a light signal on the line, an electrical signal (beat signal) having a frequency corresponding to a difference between a frequency of light on the line and a frequency of light from the second variable wavelength light source 94 is output. For example, when the wavelength of light from the variable wavelength light source 94 is 880 nm and the wavelength of light on the line is 881 nm, a beat signal of about 386 GHz is output.

This beat signal is filtered through the low-pass filter 91 for the electrical signal, and is input to the control circuit 51. Assuming that the cutoff frequency of this low-pass filter 91 is 2 GHz, and the wavelength of light from the variable wavelength light source 94 is 880 nm, this arrangement can provide the same effect as in a case wherein an optical filter having a full-width at half maximum of 0.011 nm about the wavelength of 880 nm as the center is arranged.

Figure 9:
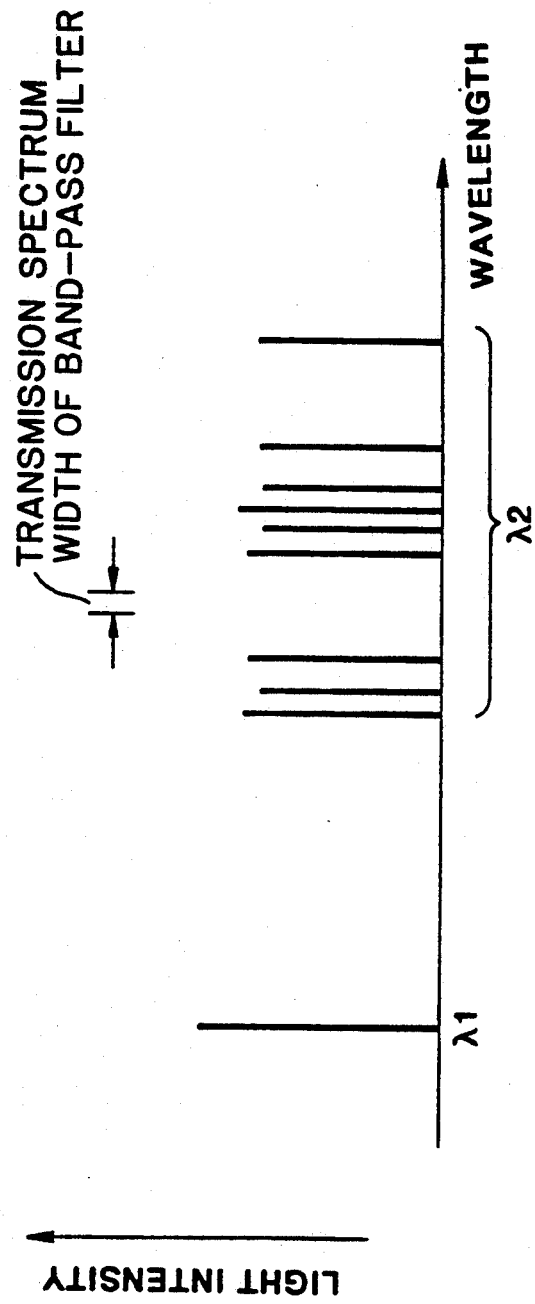
FIG. 9 is a chart showing an assignment state of wavelengths to be used in communications in the third embodiment.

The wavelengths of the variable wavelength light source 94 are swept over the entire usable wavelength range from $\lambda_A$ to $\lambda_B$ shown in FIG. 9, and an output from the low-pass filter 91 is detected, thus detecting unused wavelengths and a call signal and a acknowledgement signal to its own station.

As can be seen from the above description, the bandwidth of a wavelength used in one communication is almost equal to the bandwidth of the low-pass filter, and can be greatly narrowed as compared to the variable wavelength band-pass filter used in the first embodiment.

As a result, in this embodiment, the degree of wavelengths multiplexing can be increased as compared to the first embodiment.

The content of the present invention has been described using the first and second embodiments. However, the application range of the present invention is not limited to these embodiments. For example, the optical heterodyne detection system described in the second embodiment may be applied to the network shown in the first embodiment, and vice versa.

In the first embodiment, the first wavelength $\lambda_1$ which is not used in transmission of information is used. However, the unused second wavelength $\lambda_2$ may be used instead, or bidirectional communications may be performed using both the wavelengths $\lambda_1$ and $\lambda_2$.

Furthermore, in the above embodiment, the light source basically comprises a semiconductor laser. However, the present invention is not limited to this. Arbitrary light sources such as a gas laser, a solid-state laser, a dye laser, and the like may be employed as long as they can emit light in response to an input electrical signal.

Furthermore, these light sources need not always emit light in response to an input signal but may steadily keep emitting light, and this laser light may be modulated using an external modulator.

In the first and second embodiments, the light transmitter, the light receiver, and the light transmitter/receiver are constituted by semiconductor elements, but may be arranged by other optical members having the same functions as described above.

As described above, according to the present invention, since a means for detecting an unused wavelength from the entire usable wavelength range common to terminals which perform wavelength-division-multiplexing optical communications, and means for detecting a call signal or a acknowledgement signal to its own terminal are arranged, wavelength-division-multiplexing optical communications having a high degree of multiplexing and high use efficiency of wavelengths can be performed without executing strict reference wavelength control and wavelength absolute value control.

Third Embodiment

Figure 6:
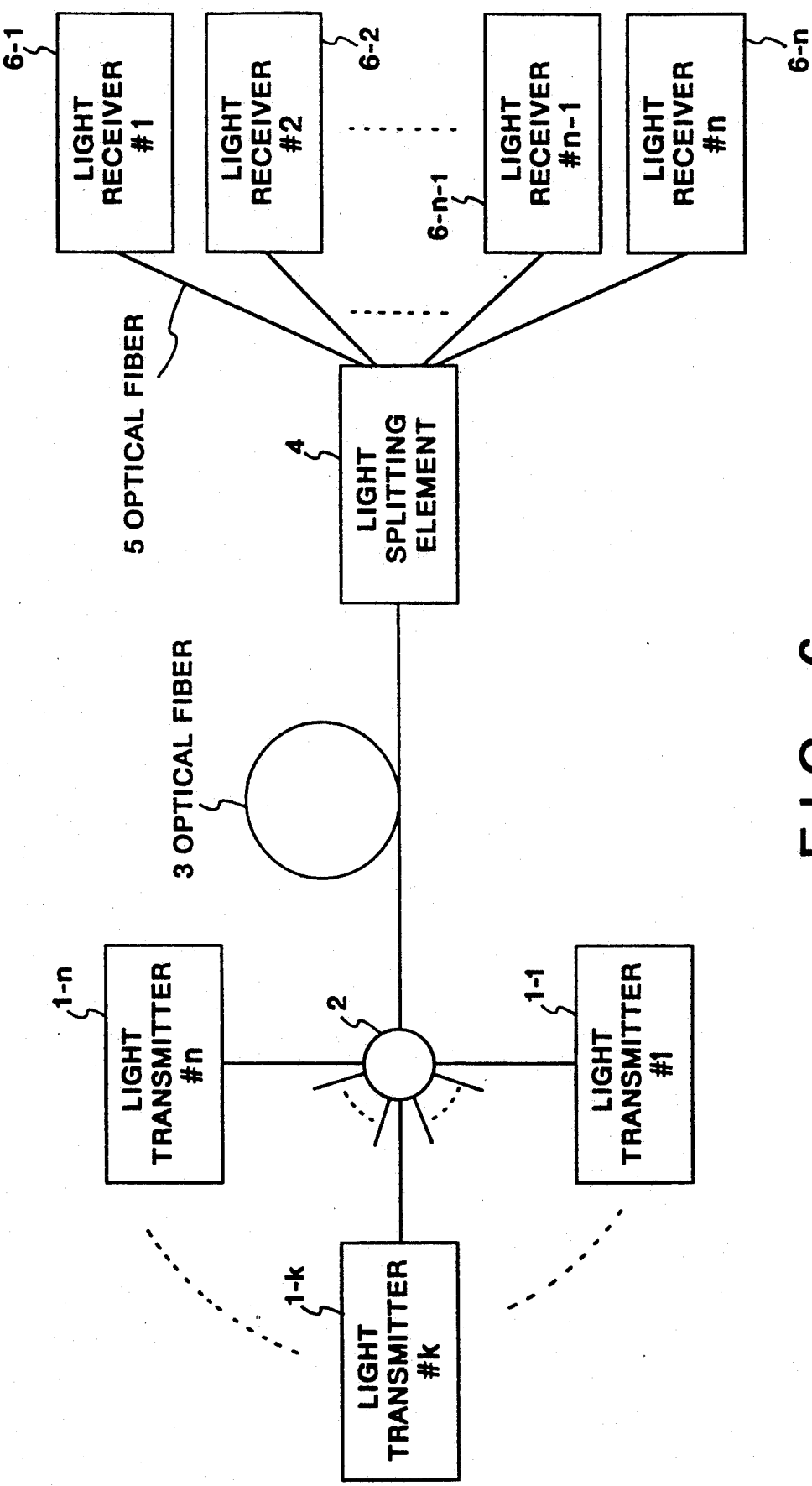
FIG. 6 is a diagram of an optical communication system according to the third embodiment of the present invention.

FIG. 6 is a diagram showing an optical communication system according to the third embodiment of the present invention. In FIG. 6, reference numerals 1-1 to 1-n denote light transmitters #1 to #n; 2, a star coupler; 3, an optical fiber; 4, a light splitting element; 5, an optical fiber; and 6-1 to 6-n, light receivers #1 to #n.

Figure 7:
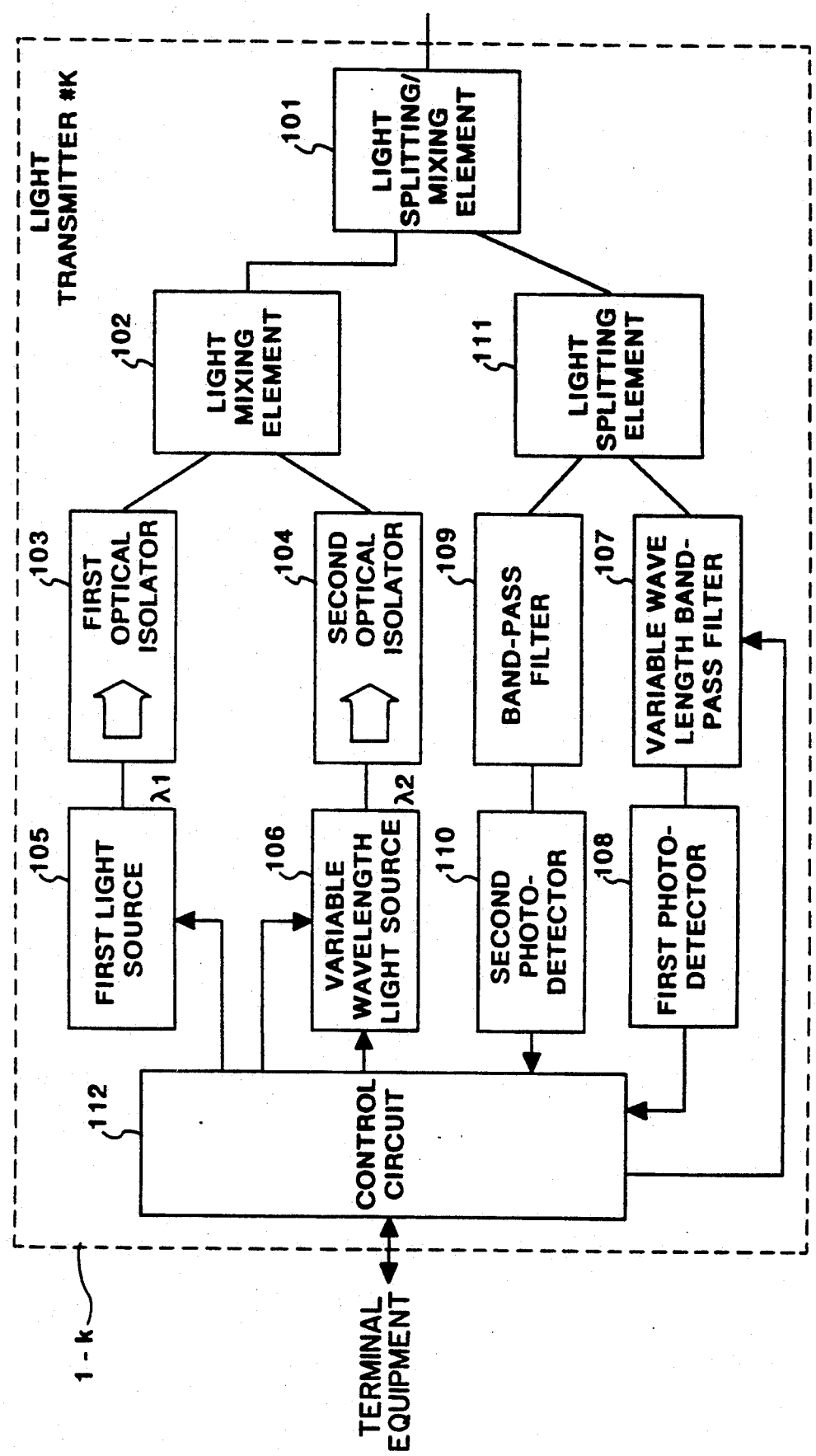
FIG. 7 is a block diagram of a light transmitter according to the third embodiment of the present invention, which constitutes the optical communication system shown in FIG. 6.

FIG. 7 is a block diagram showing the detailed arrangement of the light transmitter 1 shown in FIG. 6.

In FIG. 7, reference numeral 101 denotes a light splitting/mixing element; 102, a light mixing element; 103, a first optical isolator; 104, a second optical isolator; 105, a first light source such as a semiconductor laser for oscillating at, e.g., a given wavelength; 106, a variable wavelength light source such as a semiconductor laser which can change its oscillation wavelength; 107, a variable wavelength band-pass filter which can change a wavelength range of light passing therethrough; 108, a first photodetector; 109, a band-pass filter for allowing a light component having a given wavelength to pass therethrough; 110, a second photodetector; 111, a light splitting element; and 112, a control circuit for controlling the entire light transmitter including operations of the first light source 105, the variable wavelength light source 106, the variable wavelength band-pass filter 107, the first photodetector 108, and the second photodetector 110 to transmit data from a terminal equipment.

In the above-mentioned arrangement, the light splitting/mixing element 101, the light mixing element 102, and the light splitting element 111 can be constituted by, e.g., a half mirror, a beam splitter, and the like.

The variable wavelength light source 106, and the variable wavelength band-pass filter 107 may use the same ones as the variable wavelength light source 52 and the variable wavelength band-pass filter 55 in the first embodiment.

Figure 8:
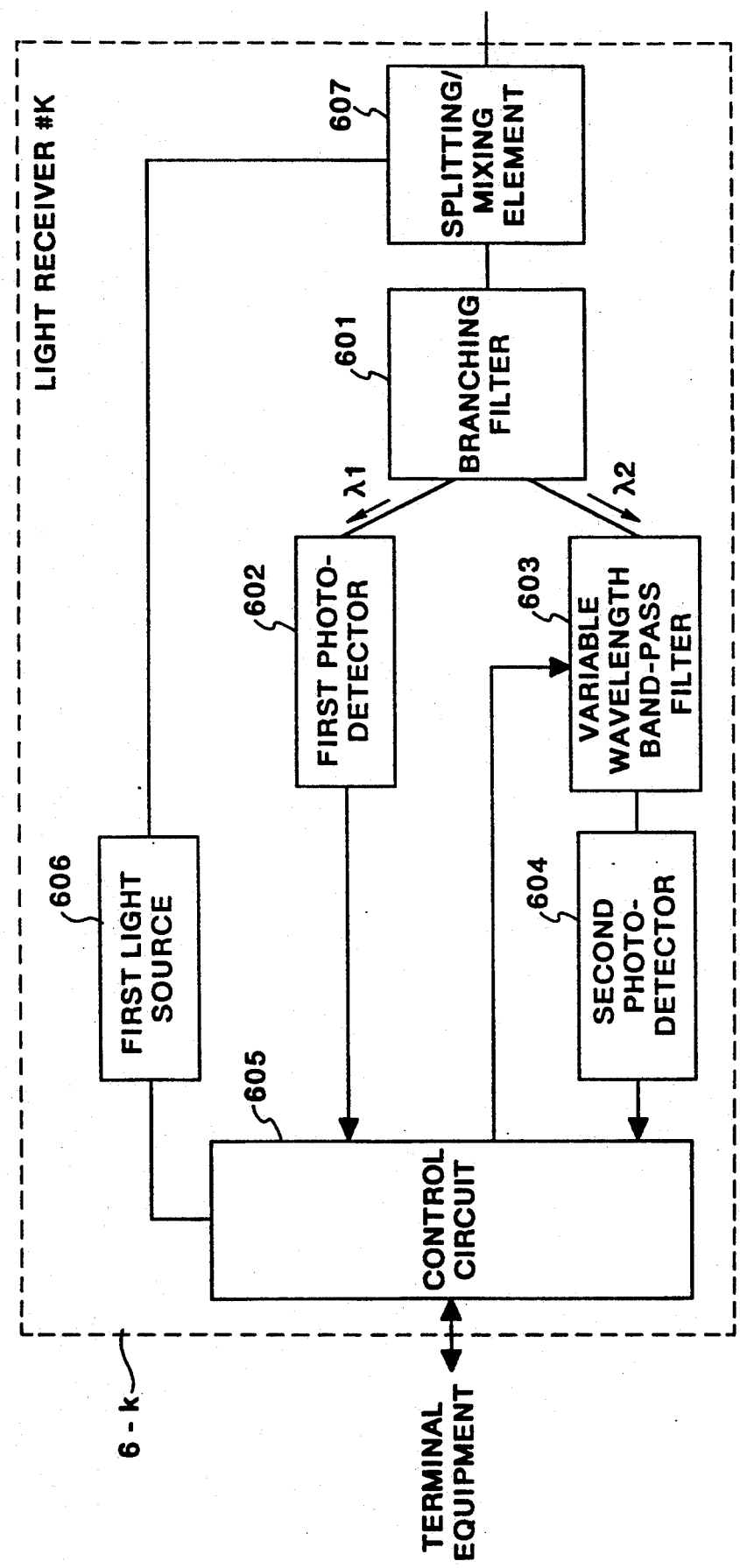
FIG. 8 is a block diagram of a light receiver according to the third embodiment of the present invention, which constitutes the optical communication system shown in FIG. 6.

FIG. 8 is a block diagram showing the detailed arrangement of the light receiver 6. In FIG. 8, reference numeral 601 denotes a branching filter; 602, a first photodetector; 603, a variable wavelength band-pass filter which can change a wavelength range of light passing therethrough; 604, a second photodetector; 605, a control circuit for controlling the entire light receiver; and 606, a first light source such as a semiconductor laser for oscillating at, e.g., a given wavelength.

The variable wavelength band-pass filter 603 in FIG. 8 can comprise the same arrangement as the variable wavelength band-pass filter 107 in the light transmitter 1 shown in FIG. 7.

Figure 10:
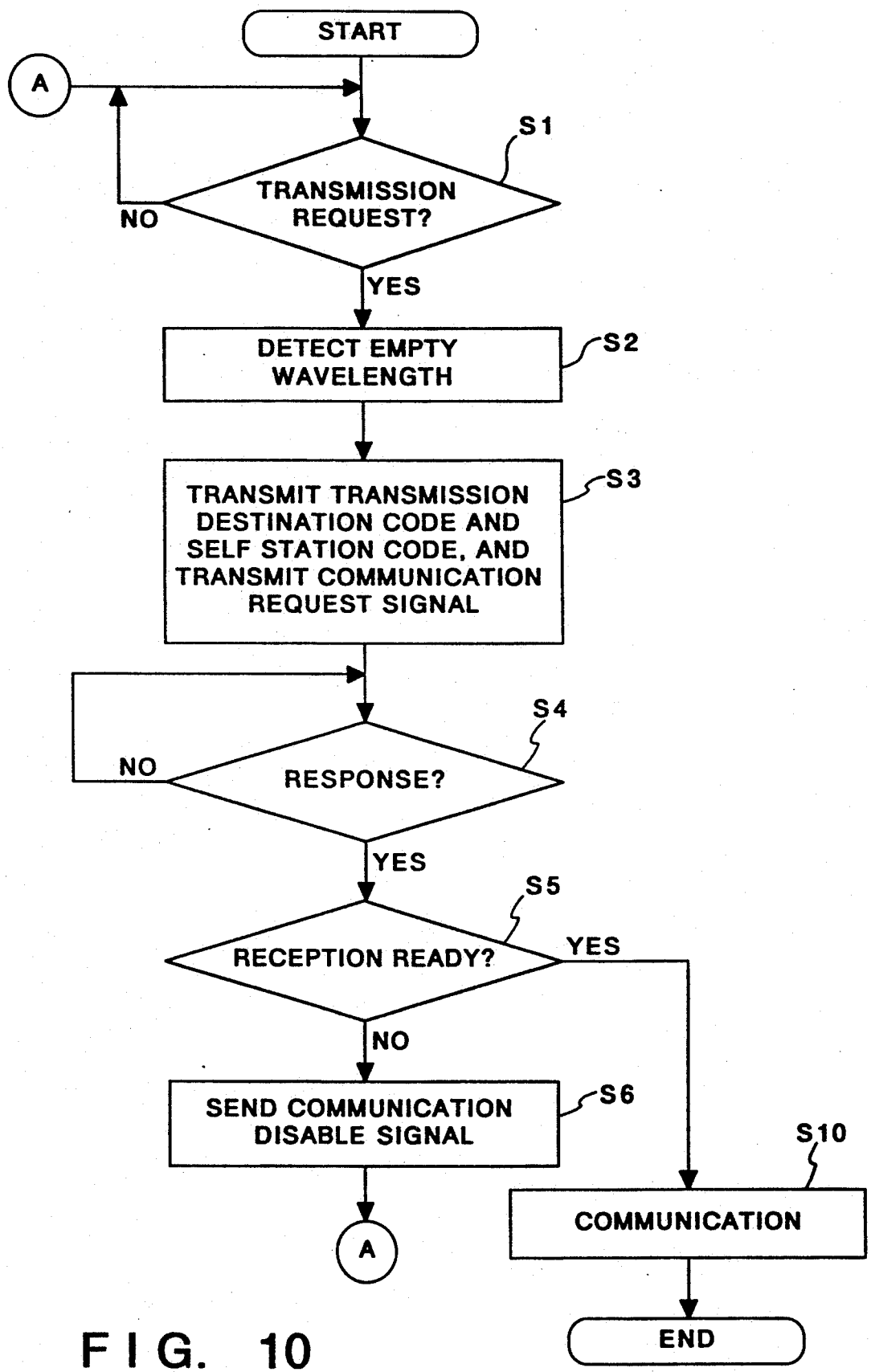
FIG. 10 is a communication control flow chart of the light transmitter of the third embodiment.
Figure 11:
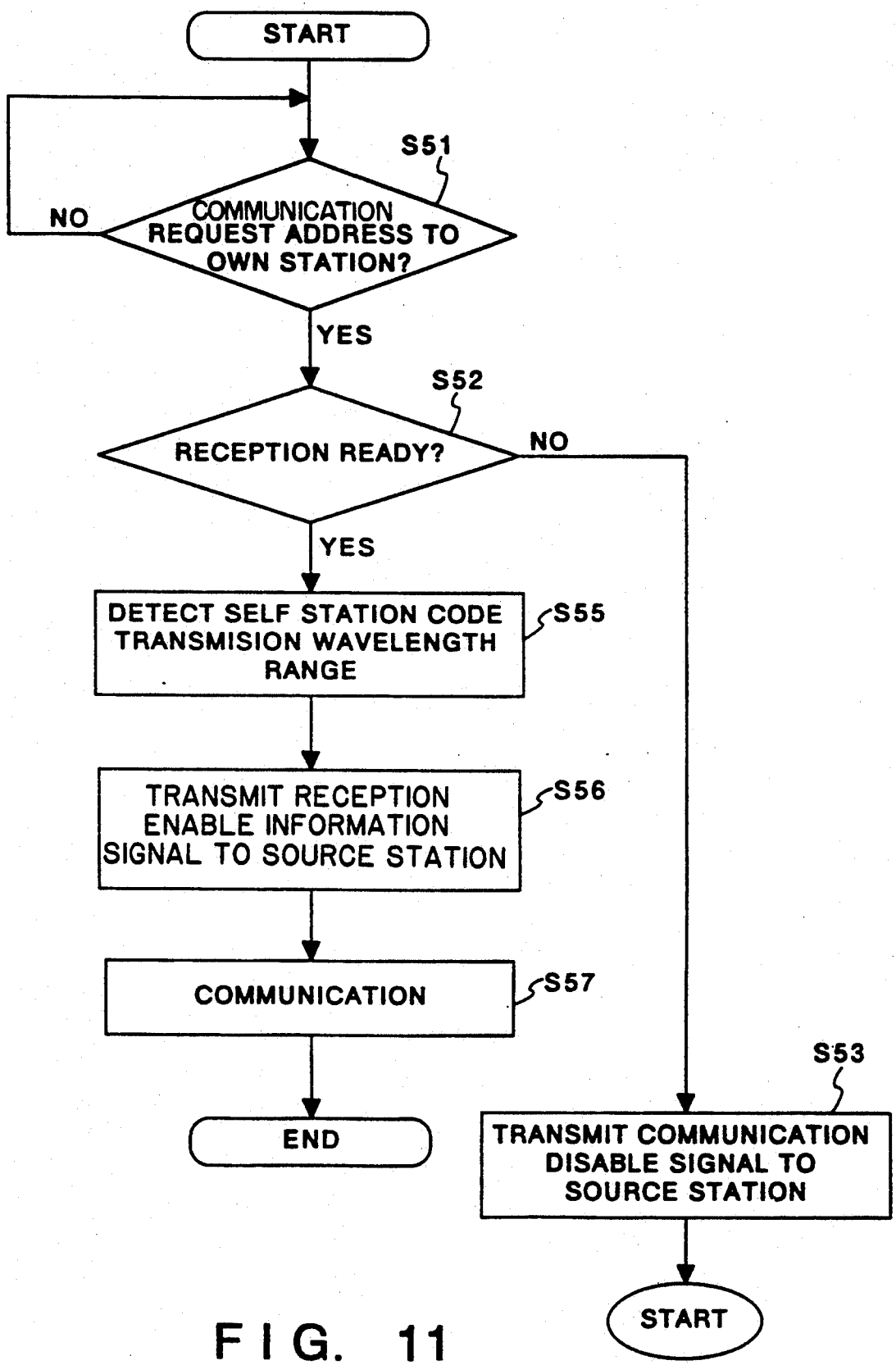
FIG. 11 is a communication control flow chart of the light receiver of the third embodiment.

A communication operation of this embodiment with the above arrangement will be described below with reference to the flow charts shown in FIGS. 10 and 11. FIG. 10 shows communication control of the light transmitter 1, and FIG. 11 shows communication control of the light receiver 6.

A wavelength range to be used is assigned to be divided into one wavelength ($\lambda_1$) and the other wavelength group ($\lambda_2$ group), which can be easily separated, as shown in FIG. 9. One wavelength $\lambda_1$ is used to set up a circuit prior to a communication, and is called a "setup frequency" in this embodiment. The other wavelength group ($\lambda_2$) is used in data communications when data is actually transmitted/received, and is called a "communication wavelength range".

In the following description, a procedure will be exemplified below when a communication is performed from a Kth light transmitter #K(1-K) to a Jth light receiver #J(6-J).

For example, the Kth light transmitter #K(1-K) can monitor a light signal transmitted from another light transmitter 1 using the first photodetector 108 through the star coupler 2 and via the light splitting/mixing element 101 and the variable wavelength band-pass filter 108 in the light transmitter #K(1-K).

When the light transmitter #K(1-K) detects a transmission request, the flow advances from step S1 to step S2 in FIG. 10. The transmitter sweeps the transmission wavelength of the variable wavelength band-pass filter 107 within the communication wavelength range to detect a wavelength ($\lambda_{2K}$) which is not used by other light transmitters 1 from the communication wavelength range. In step S3, the transmitter immediately starts transmitting a transmission destination code as a communication destination specifying signal and a self station code using light at the detected wavelength continuously.

Meanwhile, the light transmitter #K(1-K) sends a communication request signal to the light receiver #J(6-J) to communicate using a light signal having the setup wavelength ($\lambda_1$), thus sending a message indicating that the transmitter wants to start a communication. The transmitter waits for a response from the destination device using a light signal having the setup wavelength ($\lambda_1$) in step S4.

A control signal communication system using the setup wavelength ($\lambda_1$) is realized under the condition that each light transmitter 1 and each light receiver 6 can perform transmission at least once to an arbitrary light transmitter 1 or light receiver 6 within a predetermined period of time. For this purpose, this embodiment employs a time-divisional communication system.

The light receiver #J(6-J) always monitors a signal at the setup wavelength ($\lambda_1$) flowing through the optical communication line using the first photodetector 602, thus checking whether or not a communication request addressed to its own station flows through the line, as shown in step S51 in FIG. 11. When the light receiver #J(6-J) detects as a result of monitoring at the setup wavelength ($\lambda_1$) that the communication to its own station is requested, the flow advances from step S51 to step S52 to check if its own device is already receiving data. If the device is receiving data, the flow advances to step S53, and the receiver transmits a signal indicating that a communication cannot be performed, using the setup wavelength ($\lambda_1$), to the light transmitter #K(1-K) as the communication requesting device.

On the other hand, if the receiver is not receiving data but is ready for receiving data, the flow advances to step S55. The receiver checks a signal output of the second photodetector 604, and sweeps the transmission wavelength range of the variable wavelength band-pass filter 603 within the communication wavelength range ($\lambda_2$), thereby detecting a wavelength of a light signal which transmits the self station code. When the wavelength is detected, the flow advances to step S56, the light receiver #J(6-J) sends a reception enable information signal for informing that it detects the communication wavelength from the transmitter and is ready for a communication, to the light transmitter #K(1-K) as a communication requesting device using light at the setup wavelength ($\lambda_1$).

The light transmitter #K(1-K) which issued the communication request waits for a response in step S4, and can receive a response signal using the light at the setup wavelength ($\lambda_1$) from the receiver #J(6-J), which signal is output in step S53 or S55. As a result, the processing flow of the light transmitter #K(1-K) advances from step S4 to step S5, and the transmitter checks if the received response signal is the reception enable information signal. If NO in step S5, since the following data communication cannot be performed, a communication disable information signal is output for a transmission request in step S6, and the flow returns to step S1 to prepare for the next transmission request.

If the received response signal is the reception enable information signal, the flow advances from step S5 to step S10, and the transmitter starts a communication addressed to the light receiver #J(6-J) using the communication wavelength ($\lambda_2$).

The light receiver #J(6-J) similarly receives data from the light transmitter #K(1-K) in step S57 in FIG. 11.

As described above, according to this embodiment, a reference wavelength can be managed and set with a high degree of freedom between the light transmitters and the light receivers, and hence, an optical communication equipment which is very easy to utilize can be provided.

Fourth Embodiment

Figure 12:
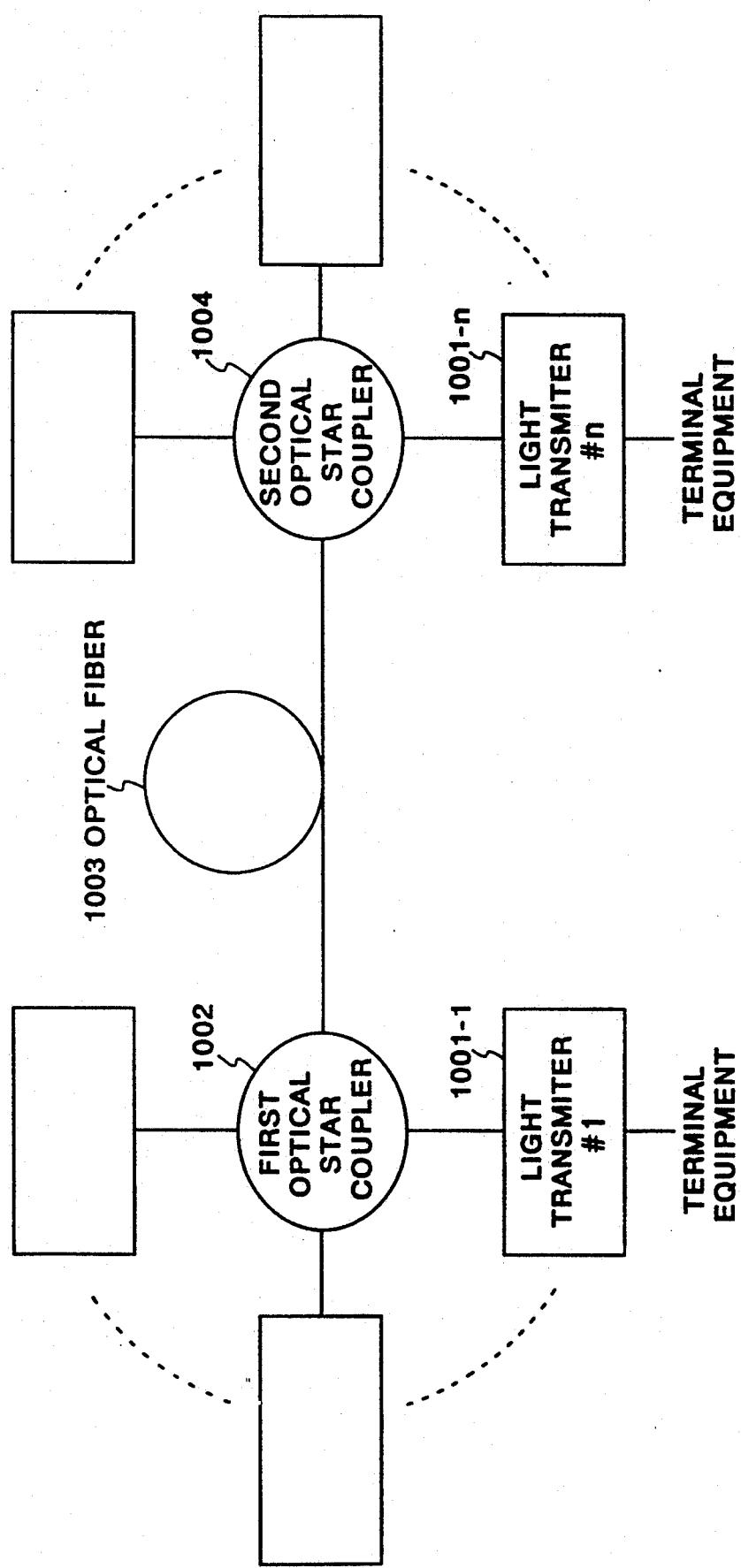
FIG. 12 is a diagram showing an optical communication system according to the fourth embodiment of the present invention.

FIG. 12 is a diagram of an optical communication system according to the fourth embodiment of the present invention. In FIG. 12, reference numerals 1001-1 to 1001-$n$ denote light transmitters/receivers #1 to #n; 1002, a first optical star coupler; 1003, an optical fiber; and 1004, a second optical star coupler.

Each of the light transmitters/receivers #1 to #n (1001-1 to 1001-$n$) is a device having functions of both the light transmitter and the light receiver of the third embodiment shown in FIG. 7 (including functions in FIG. 8), and only the control circuit 112 has a different function.

The operation of the fourth embodiment with the above arrangement will be described below.

Wavelengths to be used in this embodiment will be explained below.

Wavelengths of light used in communications are roughly divided into two ranges like in the third embodiment shown in FIG. 9. One wavelength range is used to set up a communication circuit, and the other wavelength range is used in actual communications. These wavelength ranges can be easily separated.

Therefore, as shown in FIG. 9, the wavelength range used in actual communications is defined by light components of some adjacent wavelengths.

A case will be exemplified below wherein a communication is performed between the light transmitter/receiver #1 (1001-1) and the light transmitter/receiver #n (1001-$n$).

The light transmitter/receiver #1 (1001-1) which received a communication request from a terminal equipment causes the control circuit 112 to send a sweep signal to the variable wavelength band-pass filter 107, thus sweeping a transmission wavelength range of the variable wavelength band-pass filter 107 within the communication wavelength range ($\lambda_2$).

The output signal from the first photodetector 108 is output to the control circuit 112. The control circuit 112 detects the presence/absence of reaching light based on the input signal, and fixes the transmission wavelength range of the variable wavelength band-pass filter 107 at an empty wavelength with no reaching light (this wavelength will be referred to as a communication wavelength ($\lambda_{2\ 1-n}$)).

The control circuit 112 obtains the central wavelength of the transmission wavelength range of the variable wavelength band-pass filter 107 on the basis of the sweep signal output to the variable wavelength band-pass filter 107. Furthermore, the control circuit 112 outputs a control signal to the wavelength adjustment unit of the variable wavelength light source 106 so that an oscillation wavelength is set to be equal to the transmission central wavelength of the variable wavelength band-pass filter 107.

Furthermore, the control circuit alternately outputs a self station code and a destination code to the output light modulation unit of the variable wavelength light source 106, thus beginning to transmit a light signal in which the self station code and the destination code alternately appear.

After this operation, the control circuit 112 transmits communication request data indicating that it wants to start a communication to the destination light transmitter/receiver #n (1001-$n$) in accordance with a communication system using the setup wavelength ($\lambda_1$) by the first light source 105 described above. On the other hand, each light transmitter/receiver 1001 causes the second photodetector 110 to always receive light at the setup wavelength ($\lambda_1$) passing through the band-pass filter 109, and outputs the communication content to the control circuit 112. More specifically, the control circuit 112 always monitors a communication content at the setup wavelength ($\lambda_1$).

For this reason, the light transmitter/receiver #n (1001-n) monitors the setup wavelength ($\lambda_1$) to detect whether or not another light transmitter/receiver 1001 requests a communication addressed to its own station.

When the light transmitter/receiver #n (1001-n) detects the communication request signal from another light transmitter/receiver 1001, it detects a code of a source device based on the communication content at the setup wavelength ($\lambda_1$). The control circuit 112 outputs a control signal to the variable wavelength band-pass filter 107 to sweep the transmission wavelength range of the variable wavelength band-pass filter 107 within the communication wavelength range ($\lambda_2$), thus starting a sweep operation. At the same time, the control circuit 112 begins to decode the content of the light signal received by the first photodetector 108.

As a result of signal decoding by the control circuit 112, a source device code which is transmitted using light at the setup wavelength ($\lambda_1$) and the wavelength of light which transmits the self station code are detected, and the transmission wavelength of the variable wavelength band-pass filter 107 is fixed to allow the wavelength to pass therethrough.

The control circuit 112 detects the central wavelength of the transmission wavelength range of the variable wavelength band-pass filter 107 on the basis of the control signal output to the variable wavelength band-pass filter 107, and outputs a control signal to the wavelength adjustment unit of the variable wavelength light source 106 to output light at the same wavelength as the detected central wavelength.

The control circuit 112 of the transmitter/receiver #n (1001-n) sends a communication enable signal indicating that it is ready for a communication to the first light source 105 in accordance with the communication system using the setup wavelength ($\lambda_1$) after the above-mentioned operations, and then sends the signal to the light transmitter/receiver #1 (1001-1).

The optical transmitter/receiver #1 monitors the setup wavelength ($\lambda_1$), and detects the communication enable signal from the optical transmitter/receiver #n (1001-n), thus detecting the destination device (optical transmitter/receiver #n (1001-n)) is ready for a communication. The transmitter/receiver #1 then starts a communication using the communication wavelength ($\lambda_{2\ 1-n}$).

In this communication system, the two optical transmitters/receivers alternately use the communication wavelength ($\lambda_{2\ 1-n}$) to perform a bidirectional communication.

When the light transmitter/receiver #n (1001-n) is already communicating with another light transmitter/receiver, or when a communication cannot be performed due to a condition of the terminal equipment, a message indicating that a communication cannot be performed is sent to the light transmitter/receiver #1 (1001-1) using the setup wavelength ($\lambda_1$). In this case, the transmitter/receiver #1 cancels the communication request to the light transmitter/receiver #n (1001-n) or waits for a communication enable state.

Fifth Embodiment

In the above embodiment, a bidirectional communication is performed using one communication wavelength. The light transmitters/receivers 1001-1 and 1001-n may respectively set different communication wavelengths ($\lambda_{2\ n}$ and $\lambda_{2\ n-1}$) to perform a bidirectional communication.

A circuit setup procedure in the fifth embodiment according to the present invention using two wavelengths will be described below.

A case will be exemplified below wherein a communication is performed between the light transmitter/receiver #1 (1001-1) and the light transmitter/receiver #n (1001-n).

The light transmitter/receiver #1 (1001-1) which received a communication request from a terminal equipment causes the control circuit 112 to send a sweep signal to the variable wavelength band-pass filter 107, thus sweeping a transmission wavelength range of the variable wavelength band-pass filter 107 within the communication wavelength range ($\lambda_2$). The output signal from the first photodetector 108 is output to the control circuit 112. The control circuit 112 detects the presence/absence of light based on the input signal, and fixes the transmission wavelength range of the variable wavelength band-pass filter 107 at an empty wavelength with no light (i.e., an unused wavelength; this wavelength will be referred to as a communication wavelength ($\lambda_{2\ 1-n}$) hereinafter).

The control circuit 112 determines the central wavelength of the transmission wavelength range of the variable wavelength band-pass filter 107 on the basis of the sweep signal output to the variable wavelength band-pass filter 107. Furthermore, the control circuit 112 outputs a control signal so that the output wavelength of the variable wavelength light source 106 is equal to the transmission wavelength of the variable wavelength light source 106. The control circuit alternately outputs a self station code and a destination station code to the output light modulation unit of the variable wavelength light source 106, thus beginning to transmit a light signal in which the self station code and the destination station code alternately appear.

After this operation, the control circuit 112 transmits communication request data indicating that it wants to start a communication to the destination light transmitter/receiver #n (1001-n) in accordance with a communication system using the setup wavelength ($\lambda_1$) by the first light source 105.

When the light transmitter/receiver #n (1001-n) is already communicating with another light transmitter/receiver 1001, or when an optical communication is impossible, e.g., when a terminal equipment is not set in a communication enable state, it sends back a communication disable signal indicating that to the light transmitter/receiver #1 (1001-1) which issued the communication request in accordance with the communication system using the setup wavelength ($\lambda_1$).

On the other hand, when the light transmitter/receiver #n is not in communication with another light transmitter/receiver 1001, and the terminal equipment is ready for a communication, the control circuit 112 outputs a wavelength sweep signal to the variable wavelength band-pass filter 107 to sweep the transmission wavelength range of the variable wavelength band-pass filter 107 within the communication wavelength range ($\lambda_2$), thereby detecting a wavelength with no light (i.e., an unused wavelength). The control circuit 112 detects the transmission central wavelength of the variable wavelength band-pass filter 107 based on the sweep signal. The control circuit 112 then outputs a control signal to the wavelength adjustment unit of the variable wavelength light source 106, so that the central wavelength of light output from the variable wavelength light source 106 coincides with the transmission central wavelength of the variable wavelength bandpass filter 107 (this wavelength will be referred to as a communication wavelength ($\lambda_{2\ n-1}$) hereinafter).

Subsequently, the control circuit 112 outputs a self station code and a source station code to the output light modulation unit of the variable wavelength light source 106. Thus, the self station code and the source station code are repetitively transmitted at the wavelength ($\lambda_{2\ n-1}$).

The light transmitter/receiver #n (1001-n) searches a communication wavelength ($\lambda_{2\ 1-n}$) of the source station (light transmitter/receiver #1 1001-1).

The control circuit 112 outputs a sweep signal to the variable wavelength band-pass filter 107 to sweep the communication wavelength range ($\lambda_2$), thus detecting a wavelength of a light signal sent from the light transmitter/receiver #1 (1001-1) to its own station. The control circuit 112 fixes the transmission central wavelength of the variable wavelength band-pass filter 107 at the detected wavelength ($\lambda_{2\ 1-n}$).

Since preparation for a communication is completed in this manner, when the above-mentioned operations are ended, the light transmitter/receiver #n (1001-1) transmits a signal indicating that preparation for a communication is completed to the light transmitter/receiver #1 (1001-1) using the setup wavelength ($\lambda_1$).

When the light transmitter/receiver #1 (1001-1) detects based on the signal at the setup wavelength ($\lambda_1$) that the preparation of the destination light transmitter/receiver #n (1001-n) is completed, it transmits a signal indicating that a communication is started to the destination light transmitter/receiver #n (1001-n), thus transmitting data.

Meanwhile, the light transmitter/receiver #n (1001-n) transmits data at the communication wavelength ($\lambda_{2\ n-1}$) if necessary, after it obtains the communication start signal.

Sixth Embodiment

The sixth embodiment of the present invention wherein the light transmitter 1 and the light receiver 6 of the third embodiment are realized by other arrangements will be described below with reference to FIGS. 13 and 14.

Figure 14:
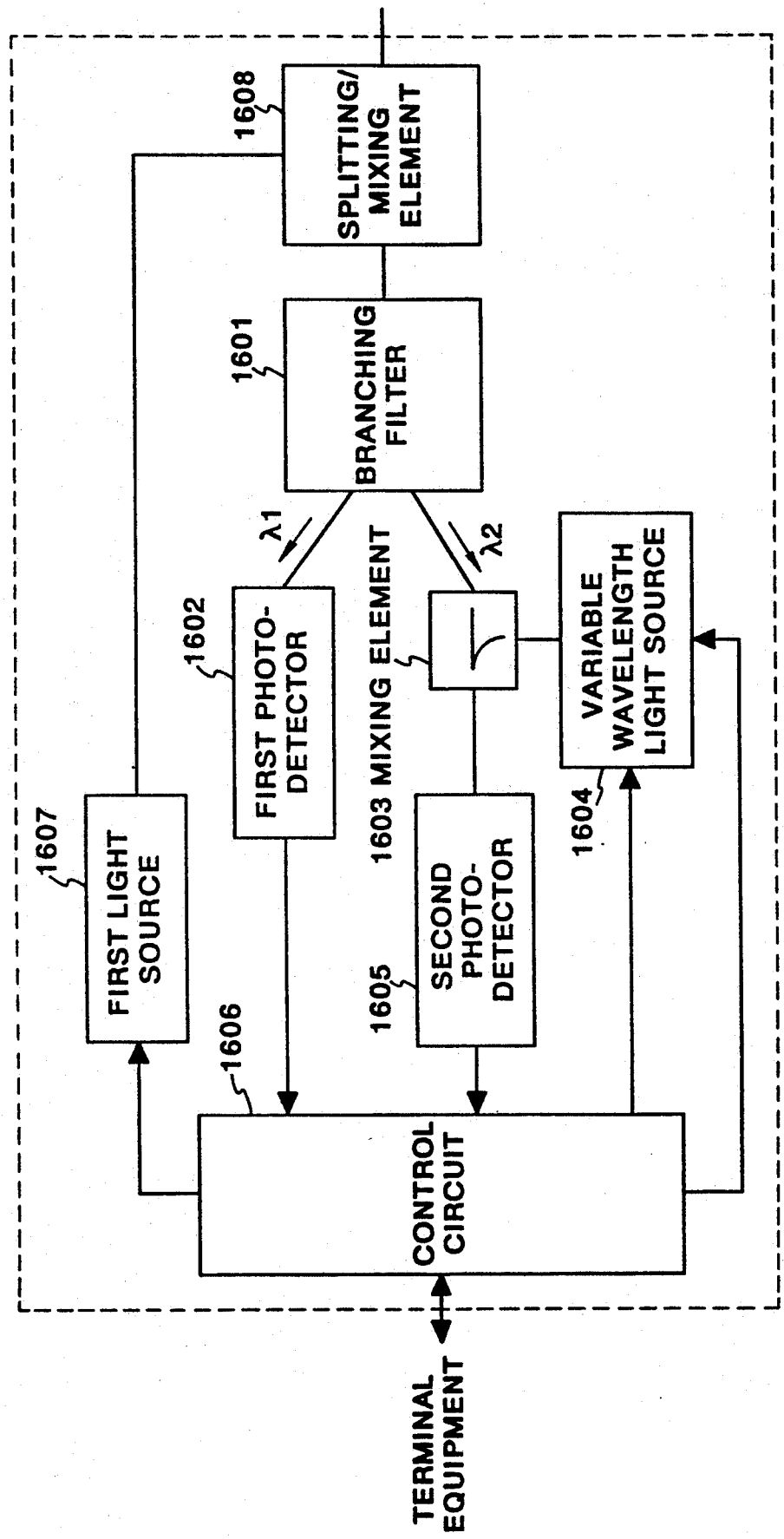
FIG. 14 is a block diagram of a light receiver according to the sixth embodiment of the present invention.
Figure 15:
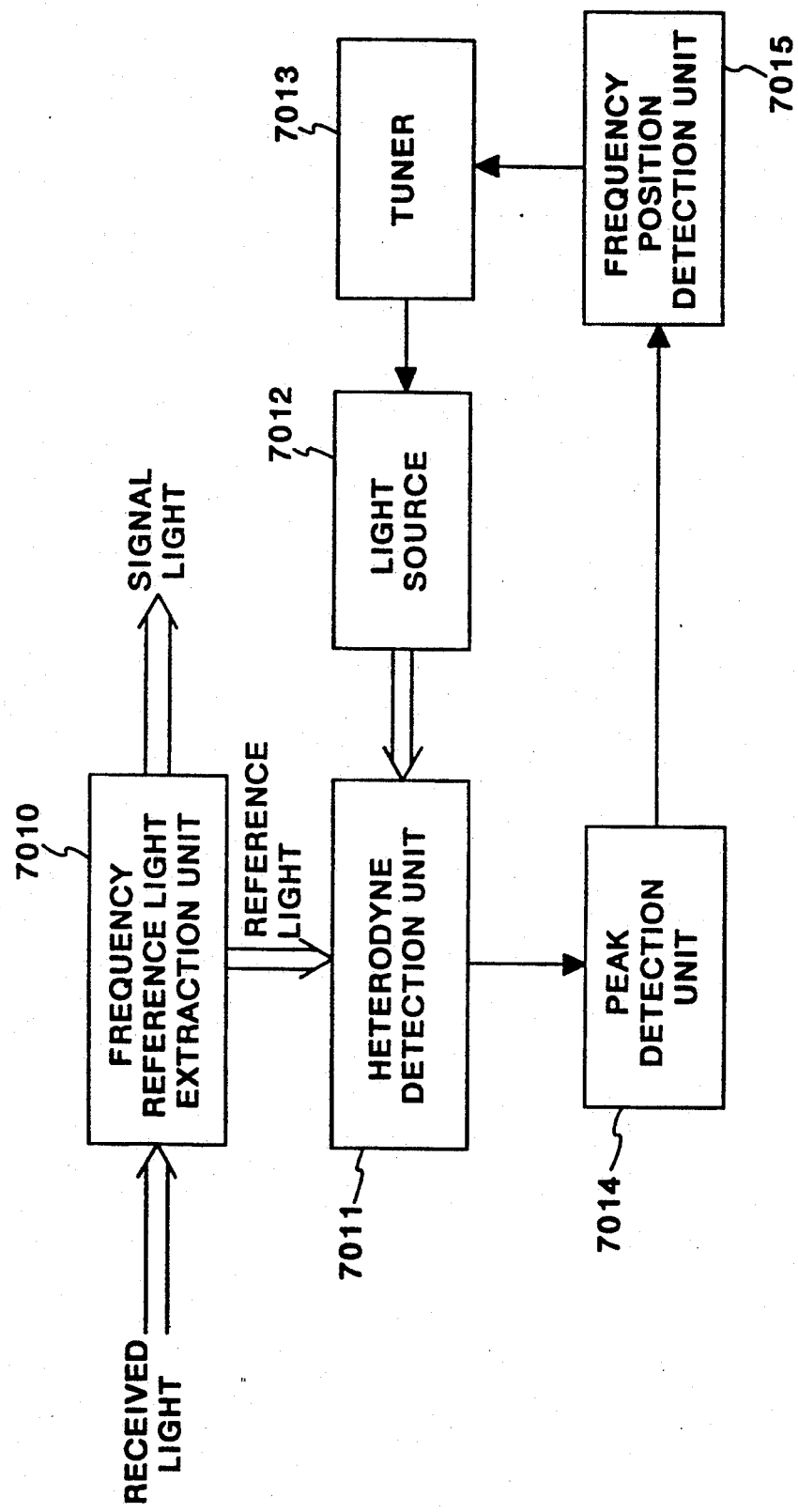
Figure 16:
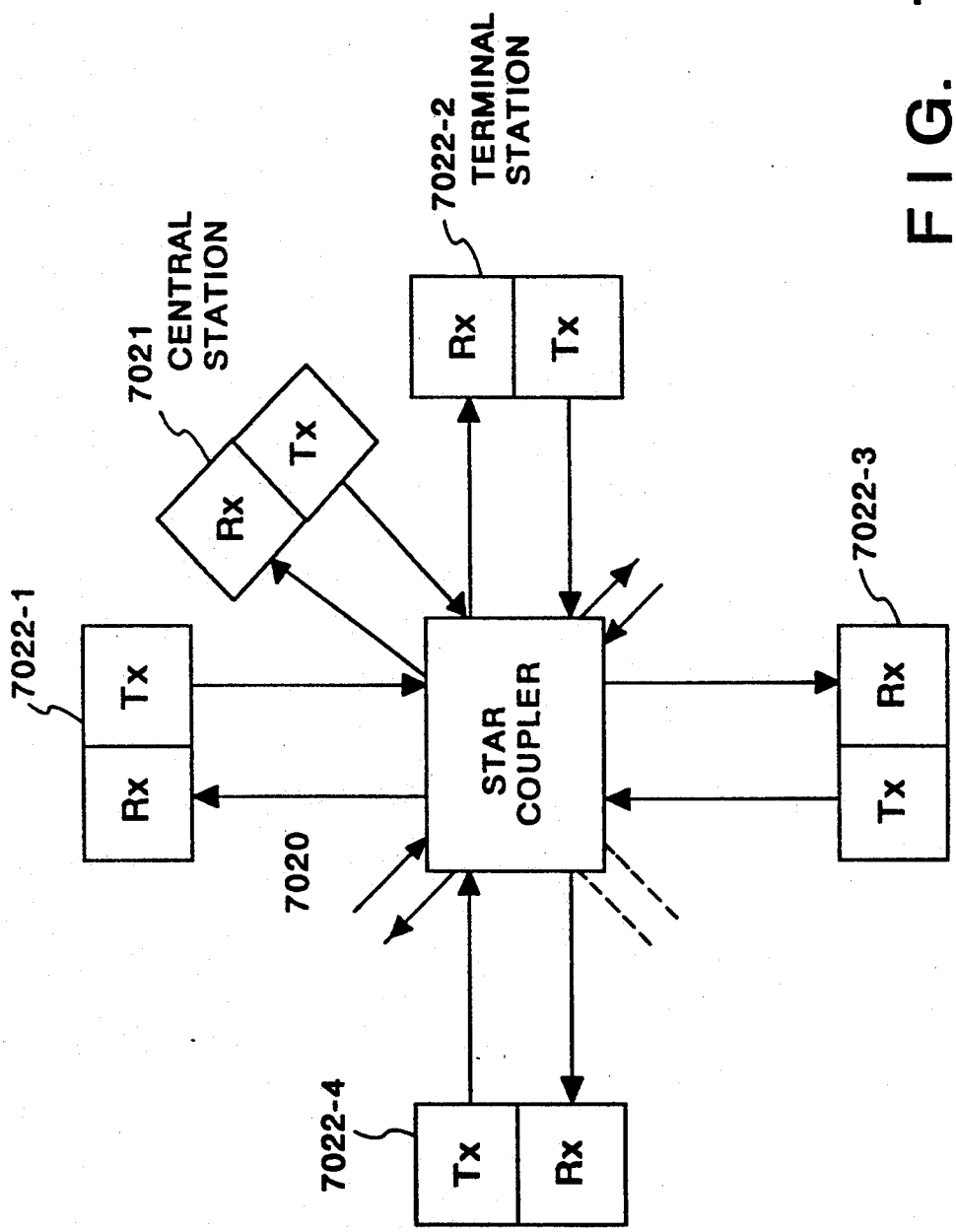

FIG. 13 is a block diagram showing an arrangement of a light transmitter 1 according to the sixth embodiment of the present invention, and FIG. 14 is a block diagram showing an arrangement of a light receiver 6 of the sixth embodiment. Note that the communication system of this embodiment has an arrangement shown in FIG. 6.

In FIG. 13, reference numeral 1101 denotes a light splitting/mixing element; 1102, a light mixing element; 1103, a first optical isolator; 1104, a second optical isolator; 1105, a first light source; 1106, a variable wavelength light source; and 1107, an optical switch which can select one of two optical paths. Reference numeral 1108 denotes a light splitting element; 1109, a light mixing element; 1110, a band-pass filter; 1111, a second photodetector; 1112, a first photodetector; and 1113, a control circuit for controlling the entire light transmitter 1.

In FIG. 14, reference numeral 1601 denotes a branching filter; 1602, a first photodetector; 1603, a light mixing element; 1604, a variable wavelength light source; 1605; a second photodetector; and 1606, a control circuit.

A communication control method of the sixth embodiment with the above arrangement is basically the same as that in the third embodiment described above. A difference from the third embodiment lies in control for searching a communication wavelength.

Wavelengths to be used in communications consist of a setup wavelength ($\lambda_1$) and a communication wavelength range group ($\lambda_2$ group) like in the third embodiment shown in FIG. 9.

In the following description, a case will be exemplified wherein data is transmitted from a light transmitter #1 (1-1) to a light receiver #5 (6-5).

The control circuit 1113 of the light transmitter #1 (1-1) which received from a terminal equipment a signal indicating that data is transmitted to another terminal equipment connected to a light receiver #3(6-3) searches a wavelength which is not used by another light transmitter 1 from the communication wavelength range ($\lambda_2$).

This operation is executed as follows. More specifically, the control circuit 1113 outputs a control signal to the optical switch 1107, so that light output from the variable wavelength light source 1106 can be input to the first photodetector 1112 via the light mixing element 1109. In this state, light from the variable wavelength light source 1106 and light from the star coupler 2 (to be referred to as "light on the line" hereinafter) are superposed and input to the first photodetector 1112. The first photodetector 1112 performs square law detection, so that a heterodyne-detected electrical signal of two light signals is output to the control circuit 1113.

In this state, when there is no light on the line, a signal output from the first photodetector 1112 includes only a DC component. On the other hand, when there is light on the line, an electrical signal (beat signal) having a frequency corresponding to a difference between a frequency of light on the line and a frequency of light from the second variable wavelength light source 1106 is output.

For example, when the wavelength of light from the variable wavelength light source 1106 is 880 nm and the wavelength of light on the line is 881 nm, a beat signal of about 386 GHz is output. However, when a signal is to be transmitted in an actual electrical system, a beat signal limit is several tens of GHz, and the control circuit 1113 cannot receive a beat signal having a high frequency near 400 GHz described above.

In this case, an electrical filter (bandwidth of several tens of GHz) is arranged in place of the variable wavelength band-pass filter 107 in the third embodiment. Thus, assuming that the electrical filter can electrically receive a signal up to 2 GHz, and the wavelength of the variable wavelength light source 1106 is 880 nm, this arrangement can provide the same effect as in a case wherein an optical filter having a full-width at half maximum of 0.011 nm about the wavelength of 880 nm as the center is arranged.

A wavelength of the variable wavelength light source 1106 is swept within the communication wavelength range ($\lambda_2$), and a beat signal from the first photodetector 1112 is monitored, so that a usable communication wavelength ($\lambda_{2\ 1-5}$) can be detected without causing radio interference with other communication signals. In addition, the wavelength of the variable wavelength light source 1106 can be set at the communication wavelength ($\lambda_{2\ 1-5}$).

After the communication wavelength ($\lambda_{2\ 1-5}$) is determined as described above, the control circuit 1113 outputs a control signal to the optical switch 1107 to change the state of the optical switch 1107 so that light output from the variable wavelength light source 1106 is output toward the star coupler 2. The control circuit 113 outputs a self station code and a source station code to the output light modulation unit of the variable wavelength light source 1106 to transmit to them to a communication request device as a light signal.

After these operations, the control circuit 1113 causes the first light source 1105 to inform a message indicating that a communication request is issued from the light transmitter #1 (1-1) to a destination receiver {e.g., the light receiver #5 (6-5)} in accordance with a communication system at the setup wavelength ($\lambda_2$).

Thereafter, the light transmitter #1 (1-1) waits for information indicating that the light receiver #5 (6-5) is ready for reception from the light receiver #5 using the setup wavelength ($\lambda_1$).

The operation of the light receiver #5 (6-5) shown in FIG. 14 will be described below.

The first photodetector 1602 in the light receiver #5 (6-5) always monitors a communication content at the setup wavelength ($\lambda_1$), and can immediately know whether or not any of the light transmitters 1 requests a communication to its own station {light receiver #5 (6-5)}.

Upon reception of a communication request from a given light transmitter 1, when the light receiver #5 (6-5) is already receiving a signal from another light transmitter 1, or when a terminal equipment is not ready for reception, the control circuit 1606 of the light receiver #5 (6-5) outputs a signal to a first light source 1607 to transmit a signal informing that a communication is impossible to the light transmitter 1 which requests a communication.

When the light receiver #5 (6-5) is ready for a communication, the control circuit 1606 outputs a control signal to sweep the wavelength of the variable wavelength light source 1604 within the communication wavelength ($\lambda_2$), thus causing the variable wavelength light source 1604 to emit light.

Light output from the variable wavelength light source 1604 is mixed with light on the line, and the mixed signal is sent to the second photodetector 1605 to be subjected to square law detection. The control circuit 1606 monitors a beat signal at this time, and detects light at a wavelength ($\lambda_{2\ 1\text{-}5}$) for transmitting its self station code and a station code of the light transmitter #1 (1-1). Then, the control circuit 1606 fixes the wavelength of output light of the variable wavelength light source 1604.

After the control circuit 1606 detects the wavelength ($\lambda_{2\ 1\text{-}5}$) of the source station (light transmitter #1 (1-5), it outputs a control signal, and the like for the first light source 1607 to transmit a signal indicating a reception enable state to the light transmitter #1 (1-1) in accordance with the communication system at the setup wavelength ($\lambda_1$).

At this time, the light transmitter #1 (1-1) causes the second photodetector 1111 to always monitor the setup wavelength ($\lambda_1$). For this reason, when the light transmitter #1 (1-1) detects that the light receiver #5 (6-5) is ready for reception, it starts a desired data communication using the communication wavelength ($\lambda_{2\ 1\text{-}5}$) for transmitting the self station code and the destination station code.

Thereafter, a communication and an end procedure between the light transmitter #1 (1-1) and the light receiver #5 (6-5) are performed using this communication wavelength ($\lambda_{2\ 1\text{-}5}$).

In the four embodiments described above, the light source basically comprises a semiconductor laser. The present invention is not limited to this, but a gas laser, a solid-state laser, a dye laser, and the like may be employed.

In the above embodiments, the light transmitter, the light receiver, and the light transmitter/receiver are constituted by using semiconductor elements, but may be constituted by other optical members having the same effects as described above.

Various other changes and modifications may be made within the spirit and scope of the invention.

As described above, according to this embodiment, a transmission wavelength range of an optical band-pass filter or an equivalent device is swept within a wavelength range used in communications in a given light transmitter, thereby detecting a wavelength range in which another communication cannot be received by the photodetector of the given light transmitter. The given light transmitter can receive a light signal at the detected wavelength. Therefore, absolute wavelength control in each light transmitter can become less strict than in the conventional device. In addition, since a light transmitter which can use an unused wavelength range is not limited, use efficiency of a wavelength range used in communications can be improved.

As described above, according to the present invention, a reference wavelength can be managed and set with a high degree of freedom among light transmitters, light receivers, and light transmitters/receivers, and hence, an optical communication equipment which is very easy to utilize can be provided.

As many apparently widely different embodiments of the present invention can be made without departing from the spirit and scope thereof, it is to be understood that the invention is not limited to the specific embodiments thereof except as defined in the appended claims.

What is claimed is;

1. An optical communication equipment for performing an optical communication with another optical communication equipment through an optical communication medium, comprising:
    first wavelength detection means for detecting an unused first wavelength from a wavelength range to be commonly used by said equipment, a destination equipment and another equipment which requests transmission and connected to the optical communication medium;
    call signal transmission means for transmitting a call signal to the destination equipment using the first wavelength detected by said first wavelength detection means;
    acknowledgement signal detection means for detecting an acknowledgement signal sent from the destination equipment in response to the call signal transmitted from said call signal transmission means from a wavelength in the range other than the first wavelength;
    call signal detection means for detecting a call signal addressed to its own equipment from the other equipment which requests transmission;
    second wavelength detection means for detecting an unused second wavelength from the wavelength range to be commonly used by the three equipment connected to the optical communication medium; and acknowledgement signal transmission means for transmitting a acknowledgement signal in response to the call signal addressed to its own equipment using the second wavelength detected by said second wavelength detection means.

2. The equipment according to claim 1, wherein said first or second wavelength detection means changes a transmission range of a variable band-pass filter over the wavelength range to be commonly used, thereby detecting an unused wavelength.

3. The equipment according to claim 1, wherein said call signal detection means or said acknowledgement signal detection means receives a signal while changing a transmission range of a variable band-pass filter, thereby detecting a desired signal.

4. The equipment according to claim 1, wherein said first and second wavelength detection means, said call signal detection means, and said acknowledgement signal detection means detect desired signals using an optical heterodyne detection method.

5. An optical communication equipment for performing an optical communication with another optical communication equipment through an optical communication medium, comprising:

wavelength detection means for detecting an unused wavelength from a wavelength range to be commonly used by the equipment and a destination equipment connected to the optical communication medium;

call signal transmission means for transmitting a call signal to the destination equipment using the wavelength detected by said wavelength detection means; and acknowledgement signal detection means for detecting an acknowledgement signal sent from the destination equipment in response to the call signal transmitted from said call signal transmission means in the wavelength range to be commonly used by the two equipment connected to the optical communication medium.

6. An optical communication equipment for performing an optical communication with another optical communication equipment through an optical communication medium, comprising:

call signal detection means for detecting a call signal addressed to its own equipment from another equipment which requests transmission from a wavelength range to be commonly used by the two equipment connected to the optical communication medium;

wavelength detection means for detecting an unused wavelength in the wavelength range to be commonly used by the two equipments; and acknowledgement signal transmission means for transmitting acknowledgement signal in response to the call signal addressed to its own equipment using the wavelength detected by said wavelength detection means.

7. An optical communication method in an optical communication equipment for performing an optical communication with another optical communication equipment through an optical communication medium, comprising the steps of:

detecting an unused wavelength from a wavelength range to be commonly used by the equipment and a destination equipment connected to the optical communication medium;

transmitting a call signal to the destination equipment using the detected wavelength;

detecting a reception enable signal sent from the destination equipment in response to the transmitted call signal from a wavelength in the range other than the wavelength; and starting a transmission of an information signal to the destination equipment through the optical communication medium.

8. An optical communication method in an optical communication equipment for performing an optical communication with another optical communication equipment through an optical communication medium, comprising the steps of:

detecting a call signal addressed to its own equipment from the another equipment which requests transmission;

detecting an unused wavelength from a wavelength range to be commonly used by the two equipment connected to the optical communication medium when the call signal is detected;

transmitting an acknowledgement signal in response to the call signal addressed to its own equipment using the detected wavelength; and receiving an information signal from the another equipment through the optical communication medium.

9. An optical communication method in an optical communication equipment for performing an optical communication with another optical communication equipment through an optical communication medium, comprising the steps of:

in a transmission mode, detecting an unused first wavelength in a wavelength range to be commonly used by the equipment and a destination equipment connected to the optical communication medium;

transmitting a call signal to the destination equipment using the detected first wavelength;

detecting a reception enable acknowledgement signal sen from the destination equipment in response to the transmitted call signal from the wavelength range; and starting transmission of an information signal to the destination equipment through the optical communication medium;

in a reception mode, detecting an unused second wavelength from the wavelength range to be commonly used by the equipment and another equipment when a call signal addressed to its own equipment from the other equipment which requests a transmission is detected;

transmitting an acknowledgement signal in response to the call signal addressed to its own equipment using the detected second wavelength; and starting reception of an information signal from the other equipment through the optical communication medium.

10. An optical communication equipment for performing an optical communication with another optical communication equipment through an optical communication medium, comprising:

wavelength detection means for detecting an unused communication enable wavelength in a usable wavelength range;

first transmission means for transmitting a communication destination specifying signal using the wavelength detected by said wavelength detection means;

second transmission means for outputting a communication request to a destination equipment using a control signal communication wavelength in the usable wavelength range;

reception enable signal detection means for detecting a reception enable information signal from the destination equipment on the control signal communication wavelength of the usable wavelength range;

communication means for, when said reception enable signal detection means detects the reception enable information signal, performing a communication with the destination equipment using the wavelength detected by said wavelength detection means;

communication request detection means for detecting a communication request addressed to its own equipment at the control signal communication wavelength;

specifying signal detection means for, when said communication request detection means detects the communication request, detecting a communication destination specifying signal addressed to its own equipment in the usable wavelength range; and third transmission means for, when said specifying signal detection means detects the specifying signal, transmitting a reception enable information signal using the control signal communication wavelength.

11. The equipment according to claim 10, wherein a bidirectional optical communication equipment is performed using only one communication enable wavelength detected by said wavelength detection means.

12. The equipment according to claim 10, wherein a bidirectional optical communication is performed using the communication enable wavelength detected by said wavelength detection means, and a wavelength different from the communication enable wavelength.

13. An optical communication equipment for performing an optical communication with another optical communication equipment through an optical communication medium, comprising:

wavelength detection means for detecting an unused communication enable wavelength in a usable wavelength range;

first transmission means for transmitting a communication destination specifying signal using the wavelength detected by said wavelength detection means;

second transmission means for outputting a communication request to a destination equipment using a control signal communication wavelength in the usable wavelength range;

reception enable signal detection means for detecting a reception enable information signal from the destination equipment on the control signal communication wavelength of the usable wavelength range; and communication means for, when said reception enable signal detection means detects the reception enable information signal, performing a communication with the destination equipment using the wavelength detected by said wavelength detection means.

14. An optical communication equipment for performing an optical communication with another optical communication equipment through an optical communication medium, comprising:

communication request detection means for detecting a communication request addressed to its own equipment at a control signal communication wavelength in a usable wavelength range;

specifying signal detection means for, when said communication request detection means detects the communication request, detecting a communication destination specifying signal addressed to its own equipment in the usable wavelength range; and transmission means for, when said specifying signal detection means detects the specifying signal, transmitting a reception enable information signal using the control signal communication wavelength.

15. An optical communication method in an optical communication equipment for performing an optical communication with another optical communication equipment through an optical communication medium, comprising:

in a transmission mode, detecting an unused communication enable wavelength in a usable wavelength range;

transmitting a communication destination specifying signal using the detected wavelength;

outputting a communication request to a destination equipment using a control signal communication wavelength in the usable wavelength range; and performing a communication with the destination equipment using the detected wavelength when a reception enable information signal from the destination equipment is detected on the control signal communication wavelength of the usable wavelength range;

in a reception mode, detecting a communication destination specifying signal addressed to its own equipment in the usable wavelength range, when a communication request addressed to its own equipment is detected at the control signal communication wavelength;

transmitting a reception enable information signal at the control signal communication wavelength when the specifying signal is detected; and performing a communication with an another equipment using the wavelength at which the communication destination specifying signal is transmitted.

16. An optical communication method in an optical communication equipment for performing an optical communication with another optical communication equipment through an optical communication medium, comprising the steps of:

detecting an unused communication enable wavelength in a usable wavelength range;

transmitting a communication destination specifying signal using the detected wavelength;

outputting a communication request to a destination equipment using a control signal communication wavelength in the usable wavelength range; and performing a communication with the destination equipment using the detected wavelength when a reception enable information signal from the destination equipment is detected on the control signal communication wavelength of the usable wavelength range.

17. An optical communication method in an optical communication equipment for performing an optical communication with another optical communication equipment through an optical communication medium comprising the steps of:

detecting a communication request addressed to its own equipment from the another equipment at a control signal communication wavelength;

detecting a communication destination specifying signal addressed to its own equipment in a usable wavelength range when the communication request is detected;

transmitting a reception enable information signal at the control signal communication wavelength when the specifying signal is detected; and performing a communication with the another equipment using the wavelength at which the communication destination specifying signal is transmitted.

* * * * *

UNITED STATES PATENT AND TRADEMARK OFFICE
CERTIFICATE OF CORRECTION

PATENT NO. : 5,212,577

DATED : May 18, 1993

INVENTOR(S) : KENJI NAKAMURA, ET AL.

It is certified that error appears in the above-identified patent and that said Letters Patent is hereby corrected as shown below:

COLUMN 1

Line 19, "such" should read --for such a--.

COLUMN 2

Line 55, "invention" should read --The present invention--.

COLUMN 8

Line 62, "lengths" should read --length--.

COLUMN 17

Line 14, "wavelength ($\lambda_2$)." should read --wavelength ($\lambda_1$).--.
Line 53, "(1-5)," should read --(1-5)),--.

COLUMN 19

Line 2, "a" should read --an--.

COLUMN 20

Line 41, "sen" should read --sent--.

UNITED STATES PATENT AND TRADEMARK OFFICE
CERTIFICATE OF CORRECTION

PATENT NO. : 5,212,577

DATED : May 18, 1993

INVENTOR(S) : KENJI NAKAMURA, ET AL.

It is certified that error appears in the above-identified patent and that said Letters Patent is hereby corrected as shown below:

<u>COLUMN 21</u>

Line 33, "equipment" should be deleted.

Signed and Sealed this

Twenty-second Day of March, 1994

Attest:

BRUCE LEHMAN

Attesting Officer

Commissioner of Patents and Trademarks